US012759426B2

(12) United States Patent
Zahid et al.

(10) Patent No.: US 12,759,426 B2
(45) Date of Patent: Oct. 13, 2026

(54) ROUTING TO AN OPTIMAL ELECTRIC VEHICLE CHARGER

(71) Applicant: TOYOTA MOTOR NORTH AMERICA, INC., Plano, TX (US)

(72) Inventors: Imad Zahid, Carrollton, TX (US); Joshua C. Batie, Frisco, TX (US)

(73) Assignees: TOYOTA MOTOR NORTH AMERICA, INC., Plano, TX (US); TOYATA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/916,879

(22) Filed: Oct. 16, 2024

(65) Prior Publication Data

US 2026/0103105 A1 Apr. 16, 2026

(51) Int. Cl.

*B60L 53/68* (2019.01)
*B60L 53/66* (2019.01)
*B60L 58/12* (2019.01)

(52) U.S. Cl.

CPC ............... *B60L 53/68* (2019.02); *B60L 53/66* (2019.02); *B60L 58/12* (2019.02); *B60L 2240/622* (2013.01); *B60L 2240/667* (2013.01); *B60L 2240/72* (2013.01)

(58) Field of Classification Search

CPC ........ B60L 53/66; B60L 53/665; B60L 53/68; B60L 58/12; B60L 2240/62; B60L 2240/622; B60L 2240/66; B60L 2240/667; B60L 2240/72; B60W 60/001; B60W 2555/20; G01C 21/34; G01C 21/3453;

(Continued)

(56) References Cited

U.S. PATENT DOCUMENTS

| | | | |
|---|---|---|---|
| 6,680,675 | B1 | 1/2004 | Suzuki |
| 9,945,679 | B2 | 4/2018 | Bender et al. |
| 10,049,389 | B2 | 8/2018 | Rider et al. |

(Continued)

FOREIGN PATENT DOCUMENTS

| | | | |
|---|---|---|---|
| CN | 106985780 | A | 7/2017 |
| CN | 108347371 | A | 7/2018 |

(Continued)

OTHER PUBLICATIONS

English translation of KR 20210006768 (Year: 2021).*

(Continued)

*Primary Examiner* — Brandon Z Willis

(57) ABSTRACT

An example operation may include one or more of determining, by a vehicle, points of interest (POIs) and attributes of the POIs based on preferences of an occupant of the vehicle, capturing measurements, by the vehicle, of a state of charge (SOC) of a battery installed within the vehicle as the vehicle moves along a route, determining that the SOC of the battery has fallen below a threshold based on the measurements, identifying, by the vehicle, a plurality of charging stations based on a current location of the vehicle, determining, by the vehicle, an optimal charging station among the plurality of charging stations based on distances from the current location of the vehicle to the plurality of charging stations, historical travel routes of the vehicle, and the attributes of the POIs, and routing, by the vehicle, the vehicle to the optimal charging station.

17 Claims, 28 Drawing Sheets

(58) Field of Classification Search
CPC ............ G01C 21/3476; G01C 21/3484; G05D 1/0212; G05D 1/0217; G05D 1/644
See application file for complete search history.

(56) References Cited

U.S. PATENT DOCUMENTS

| | | | | |
|---|---|---|---|---|
| 10,166,991 | B1 | 1/2019 | Bai et al. | |
| 10,180,333 | B2 * | 1/2019 | Jackson | B60L 58/12 |
| 10,207,716 | B2 | 2/2019 | Liu | |
| 10,358,057 | B2 | 7/2019 | Breed | |
| 10,525,845 | B2 | 1/2020 | Pursifull et al. | |
| 10,528,833 | B1 | 1/2020 | Bhatnagar | |
| 10,650,918 | B2 | 5/2020 | Bastide et al. | |
| 10,663,309 | B2 | 5/2020 | Lin et al. | |
| 10,801,849 | B2 | 10/2020 | Gusikhin | |
| 10,893,010 | B1 | 1/2021 | Argenti et al. | |
| 10,906,554 | B2 | 2/2021 | Smid et al. | |
| 10,955,252 | B2 | 3/2021 | Duale et al. | |
| 10,957,203 | B1 | 3/2021 | Chan et al. | |
| 11,107,281 | B2 | 8/2021 | Hermina Martinez et al. | |
| 11,155,167 | B2 | 10/2021 | Kuehne | |
| 11,263,653 | B1 | 3/2022 | Sumien et al. | |
| 11,318,952 | B2 | 5/2022 | Hotson et al. | |
| 11,359,926 | B2 | 6/2022 | Galan-Oliveras et al. | |
| 11,359,928 | B2 | 6/2022 | Ichinokawa | |
| 11,371,861 | B2 | 6/2022 | Moore et al. | |
| 11,519,746 | B2 | 12/2022 | Müller et al. | |
| 11,753,019 | B2 | 9/2023 | Samarthyam et al. | |
| 11,774,252 | B2 | 10/2023 | Glasgow et al. | |
| 11,775,870 | B2 | 10/2023 | Zhou et al. | |
| 11,850,967 | B1 | 12/2023 | Brannan | |
| 11,951,979 | B1 | 4/2024 | Newman et al. | |
| 11,978,129 | B2 | 5/2024 | Cella | |
| 11,988,741 | B2 | 5/2024 | Somanath et al. | |
| 2002/0152020 | A1 | 10/2002 | Seibel | |
| 2011/0238289 | A1 | 9/2011 | Lehmann et al. | |
| 2012/0109519 | A1 * | 5/2012 | Uyeki | B60L 53/68 701/426 |
| 2013/0030645 | A1 * | 1/2013 | Divine | B60K 35/28 709/217 |
| 2015/0006278 | A1 | 1/2015 | Di Censo et al. | |
| 2015/0202975 | A1 | 7/2015 | Solomon et al. | |
| 2017/0184411 | A1 | 6/2017 | Glasgow et al. | |
| 2017/0370732 | A1 | 12/2017 | Bender et al. | |
| 2017/0371608 | A1 | 12/2017 | Wasserman | |
| 2018/0052000 | A1 | 2/2018 | Larner et al. | |
| 2019/0034762 | A1 | 1/2019 | Hashimoto | |
| 2019/0043088 | A1 | 2/2019 | Garcia et al. | |
| 2019/0107406 | A1 * | 4/2019 | Cox | G01S 19/42 |
| 2019/0122058 | A1 | 4/2019 | Saeki | |
| 2019/0186939 | A1 | 6/2019 | Cox et al. | |
| 2019/0197330 | A1 | 6/2019 | Mahmoud et al. | |
| 2019/0219417 | A1 | 7/2019 | Quint | |
| 2019/0308510 | A1 * | 10/2019 | Beaurepaire | B60L 58/12 |
| 2019/0322185 | A1 | 10/2019 | Kinomura | |
| 2019/0332902 | A1 | 10/2019 | Gallagher et al. | |
| 2020/0056897 | A1 | 2/2020 | Williamson et al. | |
| 2020/0116520 | A1 | 4/2020 | Moore et al. | |
| 2020/0124426 | A1 | 4/2020 | Beaurepaire et al. | |
| 2020/0232807 | A1 | 7/2020 | Müller et al. | |
| 2020/0286391 | A1 | 9/2020 | Beaurepaire et al. | |
| 2020/0369271 | A1 | 11/2020 | Jang et al. | |
| 2021/0043301 | A1 | 2/2021 | Goel et al. | |
| 2021/0046843 | A1 * | 2/2021 | Maeda | G01C 21/3469 |
| 2021/0101502 | A1 | 4/2021 | Choi et al. | |
| 2021/0293565 | A1 | 9/2021 | Reed | |
| 2021/0302185 | A1 | 9/2021 | Zhou et al. | |
| 2021/0318685 | A1 | 10/2021 | Jenkins et al. | |
| 2021/0358105 | A1 | 11/2021 | Hantehzadeh | |
| 2021/0389147 | A1 | 12/2021 | Kim | |
| 2021/0404838 | A1 | 12/2021 | Naito | |
| 2022/0011132 | A1 | 1/2022 | Jia et al. | |
| 2022/0018672 | A1 | 1/2022 | Woll et al. | |
| 2022/0074758 | A1 | 3/2022 | Sameer | |
| 2022/0136839 | A1 | 5/2022 | Quint et al. | |
| 2022/0144123 | A1 | 5/2022 | Stichowski et al. | |
| 2022/0155093 | A1 | 5/2022 | Fear | |
| 2022/0169141 | A1 | 6/2022 | Hou et al. | |
| 2022/0176842 | A1 | 6/2022 | Cun et al. | |
| 2022/0252415 | A1 | 8/2022 | Meroux et al. | |
| 2022/0327925 | A1 | 10/2022 | Jackson et al. | |
| 2022/0334247 | A1 | 10/2022 | Chen et al. | |
| 2022/0344957 | A1 | 10/2022 | Fergadiotou et al. | |
| 2022/0355696 | A1 | 11/2022 | Ahtikari | |
| 2023/0040465 | A1 | 2/2023 | Klein et al. | |
| 2023/0058508 | A1 | 2/2023 | Bush et al. | |
| 2023/0128979 | A1 | 4/2023 | Kinsey et al. | |
| 2023/0147000 | A1 | 5/2023 | Heiden et al. | |
| 2023/0158910 | A1 | 5/2023 | Mandel-Senft et al. | |
| 2023/0158916 | A1 | 5/2023 | Haupt | |
| 2023/0171123 | A1 | 6/2023 | You et al. | |
| 2023/0249576 | A1 * | 8/2023 | Ogaki | B60L 58/10 320/109 |
| 2023/0260005 | A1 | 8/2023 | Gunapal et al. | |
| 2023/0332911 | A1 | 10/2023 | Nayak et al. | |
| 2023/0341236 | A1 | 10/2023 | Klein et al. | |
| 2023/0341535 | A1 | 10/2023 | Zhang et al. | |
| 2023/0373335 | A1 | 11/2023 | Brannan | |
| 2023/0393867 | A1 | 12/2023 | Penilla et al. | |
| 2023/0401952 | A1 | 12/2023 | Beaurepaire et al. | |
| 2024/0062555 | A1 | 2/2024 | Xu et al. | |
| 2024/0067216 | A1 | 2/2024 | Gokhale et al. | |
| 2024/0085198 | A1 | 3/2024 | Imai et al. | |
| 2024/0092210 | A1 | 3/2024 | Kim | |
| 2024/0124023 | A1 | 4/2024 | Kumar et al. | |
| 2024/0132060 | A1 | 4/2024 | Newman et al. | |
| 2024/0142969 | A1 | 5/2024 | Cella | |
| 2024/0149671 | A1 | 5/2024 | Choi | |
| 2024/0152873 | A1 | 5/2024 | Yanai | |
| 2024/0174220 | A1 | 5/2024 | Newman et al. | |
| 2024/0361137 | A1 * | 10/2024 | Aviv | B60L 58/12 |
| 2025/0065768 | A1 | 2/2025 | Raguse | |
| 2025/0085351 | A1 | 3/2025 | Tran et al. | |
| 2025/0155252 | A1 | 5/2025 | Kim et al. | |
| 2025/0170920 | A1 | 5/2025 | Terada | |
| 2025/0289306 | A1 | 9/2025 | Stout | |
| 2025/0346143 | A1 | 11/2025 | Meroux et al. | |

FOREIGN PATENT DOCUMENTS

| | | | | |
|---|---|---|---|---|
| CN | 110382285 | A | 10/2019 | |
| CN | 110758168 | A | 2/2020 | |
| CN | 114545890 | A | 5/2022 | |
| CN | 114662730 | A | 6/2022 | |
| CN | 115731697 | A | 3/2023 | |
| CN | 115892044 | A | 4/2023 | |
| CN | 117916119 | A | 4/2024 | |
| CN | 118609372 | A | 9/2024 | |
| CN | 119091332 | A | 12/2024 | |
| DE | 102022112325 | A1 | 2/2023 | |
| EP | 3822939 | A1 | 5/2021 | |
| EP | 3926588 | A1 | 12/2021 | |
| EP | 3981320 | A1 | 4/2022 | |
| EP | 4115306 | A1 | 1/2023 | |
| JP | 2017134251 | A | 8/2017 | |
| KR | 20200128282 | A | 11/2020 | |
| KR | 20210006768 | A * | 1/2021 | B60L 53/305 |
| KR | 20210074366 | A | 6/2021 | |
| KR | 102357898 | B1 | 2/2022 | |
| KR | 20250068129 | A | 5/2025 | |
| TW | I757024 | B | 3/2022 | |
| WO | 2020173584 | A1 | 9/2020 | |
| WO | 2021191685 | A2 | 9/2021 | |

OTHER PUBLICATIONS

Kerr, “Waymo’s robotaxi service set to expand into Los Angeles,” npr, Mar. 14, 2024.

Khattak et al., “Quantifying automated vehicle benefits in reducing driving stress: a simulation experiment approach”, frontiers, Aug. 14, 2023.

(56) References Cited

OTHER PUBLICATIONS

Morris, "Uptime requirements may not cure the epidemic of unreliable public EV charging," Charged EV Fleet & Infrastructure News, Dec. 20, 2023.
Sohailkhan2k22, "Benefits of Electric Cars for the Environment," Eco Vehicles, Jan. 30, 2024.
Stjohn, "What's behind the epidemic of unreliable EV chargers?" Canary Media, clean energy journalism for a cooler tomorrow, Dec. 12, 2023.
Unknown, "Model 3 Support Videos", https://www.tesla.com/de_LU/support/model-3-videos, last downloaded Jun. 15, 2024.
Unknown, "Tesla's new Autopilot is amazing—but please keep your eyes on the road", CNN Business, https://edition.cnn.com/2019/04/22/success/tesla-navigate-on-autopilot/index.html, last downloaded Jun. 15, 2024.
Unknown, "Toyota Safety Sense 3.0", Overview, Toyota, Jan. 18, 2023.
Unknown, "Toyota Safety SenseTM", Active Safety Technology, https://www.toyota.com/safety-sense/, downloaded Jun. 4, 2024.
Unknown, "What Does Ad Personalization Mean for Publishers?" jeeng.com, May 3, 2022.
Walson, "Autonomous Vehicles Break Into Tours and Attractions", Phocus Wire, Feb. 6, 2023.

* cited by examiner

100B

100C

100D

300D

400A

ROUTING TO AN OPTIMAL ELECTRIC VEHICLE CHARGER

BACKGROUND

Vehicles or transports, such as cars, motorcycles, trucks, planes, trains, etc., generally provide transportation to occupants and/or goods in a variety of ways. Functions related to vehicles may be identified and utilized by various computing devices, such as a smartphone or a computer located on and/or off the vehicle.

SUMMARY

The instant solution provides a method that includes one or more of determining, by a vehicle, points of interest (POIs) and attributes of the POIs based on preferences of an occupant of the vehicle, capturing measurements, by the vehicle, of a state of charge (SOC) of a battery installed within the vehicle as the vehicle moves along a route, determining that the SOC of the battery has fallen below a threshold based on the measurements, identifying, by the vehicle, a plurality of charging stations based on a current location of the vehicle and the POIs, determining, by the vehicle, an optimal charging station among the plurality of charging stations based on distances from the current location of the vehicle to the plurality of charging stations, historical travel routes of the vehicle, and the attributes of the POIs, and routing, by the vehicle, the vehicle to the optimal charging station.

The instant solution also provides a system that includes at least one processor and a memory, wherein the processor and the memory are communicably coupled, the processor may be configured to one or more of determine, by a vehicle, points of interest (POIs) and attributes of the POIs based on preferences of an occupant of the vehicle, capture measurements, by the vehicle, of a state of charge (SOC) of a battery installed within the vehicle as the vehicle moves along a route, determine that the SOC of the battery has fallen below a threshold based on the measurements, identify, by the vehicle, a plurality of charging stations based on a current location of the vehicle and the POIs, determine, by the vehicle, an optimal charging station among the plurality of charging stations based on distances from the current location of the vehicle to the plurality of charging stations, historical travel routes of the vehicle, and the attributes of the POIs, and route, by the vehicle, the vehicle to the optimal charging station.

The instant solution further provides a computer-readable storage medium comprising instructions, that when read by a processor, cause the processor to perform one or more of determining, by a vehicle, points of interest (POIs) and attributes of the POIs based on preferences of an occupant of the vehicle, capturing measurements, by the vehicle, of a state of charge (SOC) of a battery installed within the vehicle as the vehicle moves along a route, determining that the SOC of the battery has fallen below a threshold based on the measurements, identifying, by the vehicle, a plurality of charging stations based on a current location of the vehicle and the POIs, determining, by the vehicle, an optimal charging station among the plurality of charging stations based on distances from the current location of the vehicle to the plurality of charging stations, historical travel routes of the vehicle, and the attributes of the POIs, and routing, by the vehicle, the vehicle to the optimal charging station.

DETAILED DESCRIPTION

Figure 1A:
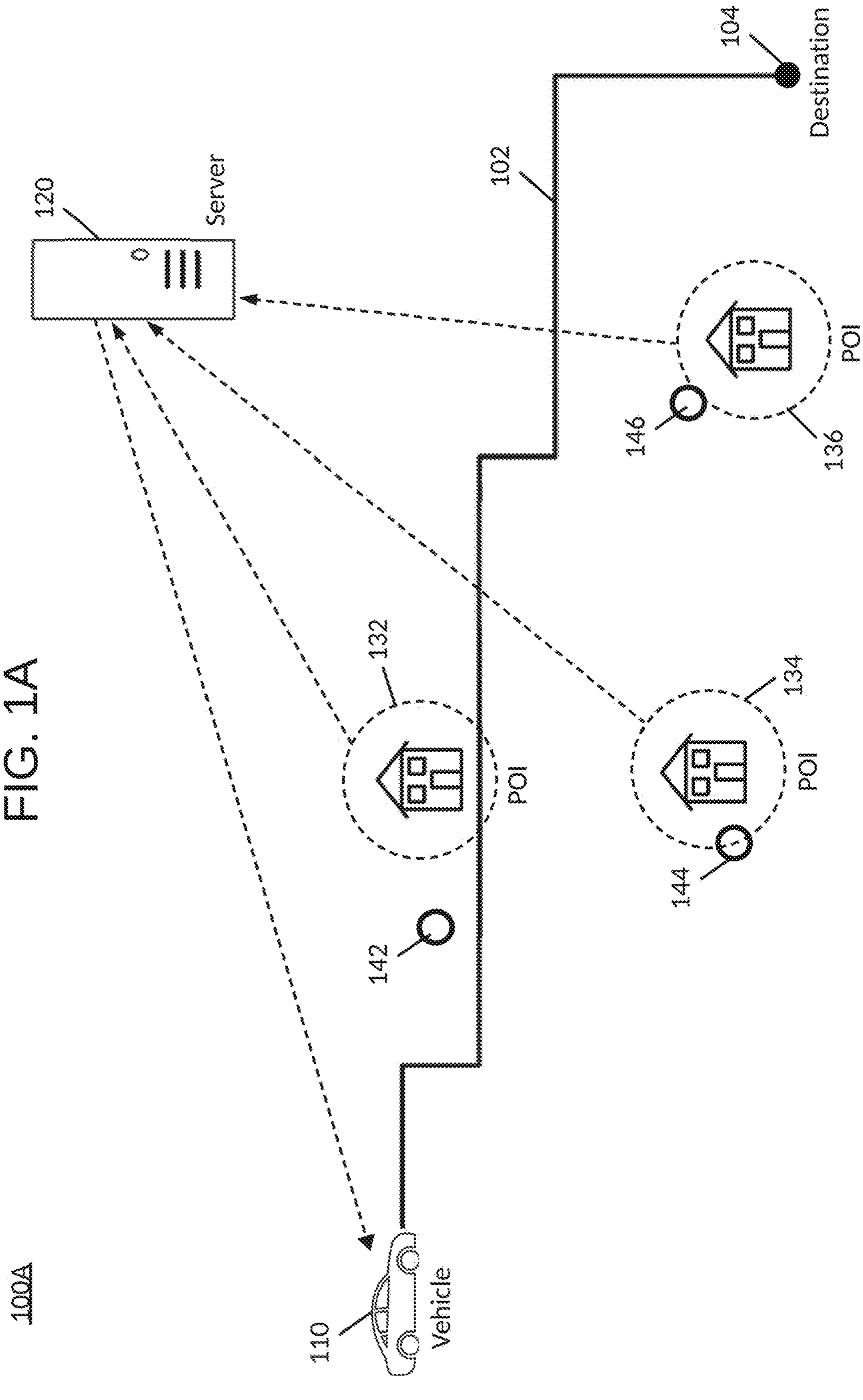
FIG. 1A is a diagram illustrating a process of identifying points of interest (POI) of a vehicle according to an example of the instant solution.

It will be readily understood that the instant components, as generally described and illustrated in the figures herein, may be arranged and designed in a wide variety of different configurations. Thus, the following detailed description of the instant solution of at least one of a method, apparatus, computer-readable storage medium system, and other element, structure, component, or device as represented in the attached figures, is not intended to limit the scope of the application as claimed but is merely representative of aspects of the instant solution.

Communications between the vehicle(s) and certain entities, such as remote servers, other vehicles, and local computing devices (e.g., smartphones, personal computers, vehicle-embedded computers, etc.) may be sent and/or received and processed by one or more 'components' which may be hardware, firmware, software, or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle (s) and one or more of the components outside or at a remote location from the vehicle(s).

The instant features, structures, or characteristics described in this specification may be combined in any suitable manner in the instant solution. Thus, the one or more features, structures, or characteristics of the instant solution, described or depicted in this specification, are utilized in various manners. Thus, the one or more features, structures, or characteristics of the instant solution may work in conjunction with one another, may not be functionally separate, and these features, structures, or characteristics may be combined in any suitable manner. Although presented in a particular manner, by example only, one or more feature(s), element(s), and step(s) described or depicted herein may be utilized together and in various combinations, without exclusivity, unless expressly indicated otherwise herein. In the figures, any connection between elements (for example, a line or an arrow) can permit one-way and/or two-way communication, even if the depicted connection shown is a one-way or two-way connection.

In the instant solution, a vehicle may include one or more of cars, trucks, Internal Combustion Engine (ICE) vehicles, battery electric vehicle (BEV), fuel cell vehicles, any vehicle utilizing renewable sources, hybrid vehicles, e-Palettes, buses, motorcycles, scooters, bicycles, boats, recreational vehicles, planes, drones, Unmanned Aerial Vehicles and any object that may be used to transport people and/or goods from one location to another.

In addition, while the term "message" may have been used in the description of method, apparatus, computer-readable storage medium system, and other element, structure, component, or device, other types of network data, such as, a packet, frame, datagram, etc. may also be used. Furthermore, while certain types of messages and signaling may be depicted in exemplary configurations they are not limited to a certain type of message and signaling.

Example configurations of the instant solution provide methods, systems, components, non-transitory computer-readable storage mediums, devices, and/or networks, which provide at least one of a transport (also referred to as a vehicle or car herein), a data collection system, a data monitoring system, a verification system, an authorization system, and a vehicle data distribution system. The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

An instant method, apparatus, computer-readable storage medium system, and other element, structure, component, or device provides a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the vehicle, the exterior of the vehicle, on a fixed object apart from the vehicle, and/or on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach may not be implemented on a traditional centralized database.

Various driving systems of the instant solution can utilize software, an array of sensors as well as machine learning functionality, light detection and ranging (LiDAR) projectors, radar, ultrasonic sensors, etc. to create a map of terrain and road that a vehicle can use for navigation and other purposes. In some examples of the instant solution, global positioning system (GPS), maps, cameras, sensors, and the like can also be used in autonomous vehicles in place of LiDAR.

The instant solution includes, in certain instant examples, authorizing a vehicle for service via an automated and quick authentication scheme. For example, driving up to a charging station or fuel pump may be performed by a vehicle operator or an autonomous vehicle and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as having a single storing place of all data and also implies that a given set of data only has one primary record. A decentralized database, such as a blockchain, may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

The example embodiments are directed to a vehicular system that can optimize the routing of an electric vehicle (EV) to a charging location based on points of interest in proximity to charging stations along the route. Electric cars contribute to cleaner air by reducing pollutants such as nitrogen oxide and particulate matter. These pollutants are known to cause respiratory problems and contribute to air pollution. Adopting electric cars can lead to improved air quality, benefiting individuals and communities. Electric cars produce zero tailpipe emissions and do not burn fossil fuels like gasoline-powered vehicles. By eliminating the combustion process, electric cars significantly reduce greenhouse gas emissions. This reduction in emissions plays a crucial role in mitigating climate change and its adverse environmental effects.

However, despite the numerous advantages, the widespread adoption of electric cars faces challenges. Limited charging infrastructure, long charging times, and range anxiety are some barriers that need to be addressed. Additionally, controversies exist regarding the environmental impact of electric car production and battery disposal.

With EV charging, where you charge may not be as interesting to a consumer as what they do while they're charging. The likelihood of a 5-minute charging experience that parallels the gasoline experience, is not possible at this point, and even when it does become possible may not be financially feasible. Therefore, as EV adoption grows, how the owner of the EV can spend their time while charging may become important. Sleeping, working, and entertainment are obvious options, but more creative options will help EV adoption grow even faster. For example, points of interest (POI) and attributes at the POI may help draw consumers to charge their EV at the locations.

In the example embodiments, POIs include shopping, vehicle service and maintenance, sightseeing, visiting with friends, and the like. Intelligent EVs and applications can make suggestions, planning, and implementation easy to incorporate EV charging into trip plans. As autonomous EVs become a reality, road trips could replace air travel for many travel destinations. As such, trip planning, routing, and charging details will be imperative.

The example embodiments are directed to a system that can perform the optimal routing of an EV to a charging station based on points of interest in proximity to charging stations along the route. The system includes an intelligent routing system that guides a vehicle to an optimal charging station by dynamically assessing various factors and occupant preferences. The system may consider travel time to the charging station and the time required to charge the vehicle, accounting for the more extended travel leading to a smaller State of Charge (SOC) gain. It also considers the occupants' available time, potentially for multiple occupants, the type of charger (supercharger vs. regular charger), and compatibility issues, such as using a Tesla supercharger without a Tesla, which may take longer. The cost to charge once reaching the CL is factored in, considering whether the station is working, its availability, and charging speed. The system also evaluates Points of Interest (POIs) that occupants are interested in, such as retail shops, restaurants, coffee shops, hiking trails, shopping centers, exercise facilities, etc. Social factors, like the presence of acquaintances at the location and the duration of their stay, are also considered, treating the POI as an individual factor.

In some embodiments, the system may determine the most suitable charging station based on the occupant's historical preferences and real-time conditions. For example, weather can influence the ranking of POIs, with a scenic hike deprioritized when raining. Time-specific preferences are also considered, such as favoring a coffee shop in the morning. The system continuously assesses the current SOC and the vehicle's direction (towards or away from home) to determine the importance of cost versus necessity. If heading home, cost sensitivity might be higher as the vehicle may be charged at home, whereas traveling away from home might increase the willingness to pay more for charging due to necessity.

In the example embodiments, the system may continuously analyze these factors and may reroute the vehicle to a better charging station if it becomes available. For example, the vehicle might initially route to CL1 based on cost considerations, then reroute to CL2 if it offers better POIs or other benefits despite higher costs. The system may dynamically update each charging station's positive and negative characteristics, allowing for continuous monitoring and rerouting if a better option arises. In some embodiments, the system may evaluate whether occupants are willing to drive further, spend more time, or incur higher costs for better POI benefits. When the occupant leaves the vehicle for activities like shopping or hiking, the system informs them of price changes or other relevant updates via notifications, such as through the TL1 app. The vehicle can monitor the occupant's location and send alerts if necessary, prompting the occupant to return to the vehicle if prices rise or conditions change.

In some embodiments, the system may balance attributes such as the time aspect, the cost aspect, and the acquaintance already at the charging station by implementing a multi-criteria decision-making approach using a weighted scoring system to evaluate and prioritize each factor according to its importance to the user. This process begins with data collection and integration, gathering user-specific data such as preferences for minimizing travel time, reducing costs, and social factors like meeting an acquaintance at a charging station. Additionally, real-time traffic data, environmental factors, and charging station information may be collected to understand current conditions comprehensively.

In some embodiments, the system may evaluate the initial route and charging station options based on travel time, cost, and the presence of acquaintances. Utilizing an algorithm, AI model, etc., the system may balance these factors by assigning weights according to user preferences. For example, if the user prioritizes social interactions, the weight for meeting an acquaintance will be higher. The system then quantifies each factor: calculating the total travel time for each route, estimating the cost of charging at each station, and determining the value of social interaction, which could be a binary factor or have varying degrees of importance.

The system may assign scores to each route and charging station option based on the weighted factors. For example, travel time might be scored and weighted more heavily if it is a priority for the user while charging costs, and the presence of acquaintances is also scored and weighted accordingly. The system calculates a net improvement score for each option by summing the weighted scores of the time, cost, and social factors. It then selects the route and charging station with the highest net improvement score, indicating the best balance of travel time, price, and social interaction.

In a practical example, suppose a user has three potential charging station options (A, B, and C) along different routes to their destination. The user prefers minimizing travel time, reducing costs, and values meeting an acquaintance. Option A has a travel time of 40 minutes, costs $15, and has no acquaintance present, resulting in a net improvement score of 24.5. Option B has a travel time of 45 minutes, costs $10, and includes meeting an acquaintance, resulting in a net improvement score of 25.7. Option C has a travel time of 35 minutes, costs $20, and no acquaintance present, resulting in a net improvement score of 23.5. In this example, Option B, despite the slightly longer travel time, offers the best overall experience due to the lower cost and the social benefit of meeting an acquaintance.

The system may maintain communication between an occupant and their vehicle when they leave the vehicle, such as for shopping or hiking. The system ensures that the occupant stays informed about significant changes, such as charging changes, such as charging speed, price increases, etc. When the occupant leaves the vehicle, the vehicle continues to monitor conditions related to the ongoing charging and maintains contact with the occupant. If there is a change (such as a price increase at the charging station) or another update, the vehicle sends a notification to the occupant's mobile phone. The occupant's phone, equipped with a software application, can respond to these notifications and determine the occupant's movements. The application may check if the occupant is walking towards the vehicle. If the occupant is not heading toward the vehicle, the vehicle sends another notification to the phone, prompting the occupant to either turn back to the vehicle or confirm that the price increase or other update is acceptable. The system would not require explicit actions from the occupant; it infers the occupant's decision mentally. The device may determine the occupant's actions, such as physical actions (e.g., walking towards the vehicle) or explicit confirmation through the app (e.g., confirming the price increase is acceptable).

As another example, suppose an occupant leaves their electric vehicle at a charging station to go shopping. During this time, a modification is performed to the charging, such as price increases. The vehicle sends a notification to the occupant's phone about the price increase. The application on the phone checks if the occupant is walking back to the vehicle. If the application determines that the occupant is not returning to the vehicle, it sends a notification prompting the occupant to either return to the vehicle or confirm that they accept the new price. In another example of the solution, the device's app responds dynamically to the notification.

The system may be configured to optimize the routing to charging stations based on the preferences of the vehicle's occupants and the current state of charge (SOC) of the vehicle. The vehicle may determine the POIs related to the preferences of the occupant. The solution gathers data on the occupant's interests, including places like restaurants, coffee shops, shopping centers, parks, or any other locations the occupant frequently visits or has expressed interest in. This information can be obtained through historical data stored in the vehicle's system, user profiles, or through direct input from the occupants. The vehicle continuously monitors its SOC as it travels along a route. The SOC is a critical parameter that indicates how much battery charge remains, and it helps the solution decide when to look for charging stations. When the SOC drops below a predefined threshold, the vehicle identifies suitable charging stations.

The system may evaluate potential charging stations by considering the vehicle's distance from the stations. The solution calculates the travel time and energy consumption required to reach each charging station. In addition to distance, the solution assesses the quantity and quality of POIs along the route to the charging stations and the charging stations themselves. The quality of POIs is ranked higher for those located at the charging stations than those along the route, as the primary goal is to make the charging process as beneficial and enjoyable as possible for the occupant. Once these factors are assessed, the vehicle uses the information to route itself to one of the charging stations. The routing decision is based on the distance to the charging station, the number of POIs along the route, and the quality ranking of these POIs. The solution employs a weighted scoring algorithm, AI model, or the like, to balance these factors according to the occupant's preferences. For example, if an occupant values shorter travel time and high-quality POIs, the system will prioritize charging stations that are closer and have highly ranked POIs.

In some embodiments, the routing system may optimize the charging process by prioritizing POIs matching occupants' preferences. The solution guides the vehicle to the nearest or most cost-effective charging station and incorporates a sophisticated algorithm to evaluate and rank POIs based on user-specific data. When the vehicle's SOC drops below a certain threshold, the solution dynamically assesses various charging stations by analyzing the distance to each station, the type of chargers available, and the quality of POIs nearby. For instance, if an occupant frequently visits coffee shops in the morning, the system may prioritize routing to a charging station near a high-rated coffee shop. The AI model may continuously learn and adapt to the user's preferences and historical routes and stops, considering weather conditions, time of day, and historical data on preferred activities. The embodiment features real-time POI updates. If a new, highly-rated restaurant opens near a charging station, or if an event is happening at a nearby park, the solution can reroute the vehicle to take advantage of these new opportunities, ensuring that the charging experience is not only efficient but also enjoyable and aligned with the occupant's interests.

In some embodiments, the system monitors and dynamically updates charging routes based on changing conditions. As the vehicle travels, the system assesses traffic conditions, SOC, charging station availability, and POI relevance. If a more optimal charging station becomes available during the trip, the solution will automatically reroute the vehicle. This could be due to a variety of reasons, such as a decrease in wait time at a closer charging station, a newly available faster charger, or the emergence of a high-interest POI. The system may determine a real-time net improvement score for each charging option, ensuring the best possible route is always selected. Additionally, the system may keep the occupant informed through the application. If the vehicle is left charging while the occupant engages in other activities, the solution sends alerts about significant changes, such as price increases or charging speed adjustments. The application can detect the occupant's movements, such as walking back to the vehicle, and send reminders if they need to return due to significant changes. This ensures that the occupant remains informed and can make timely decisions without constantly monitoring the vehicle.

FIG. 1A illustrates a process 100A of identifying points of interest (POI) of a vehicle according to an example of the instant solution. Referring to FIG. 1A, a vehicle 110 may be travelling along a route 102 toward a destination 104. In this example, the route 102 may be displayed on a graphical user interface (GUI) of a software application installed within a display system of the vehicle 110, for example, an infotainment system, a navigation system, a mobile device, or the like. For example, the software application may be hosted by a server 120 such as a web server, cloud platform, and the like. The server 120 may host the software installed in the vehicle 110. In this example, the server 120 may connect to the vehicle 110 over a computer network such as the Internet.

The server 120 may receive global positioning system (GPS) coordinates of the vehicle 110 and the route 102 of the vehicle including the destination 104 from the vehicle 110. The GPS coordinates may be of a current location of the vehicle 110. Furthermore, the server 120 may also be in network communication with a plurality of points of interest (POIs), for example, computing systems that are located or otherwise installed at the POIs. A POI may correspond to a restaurant, a coffee shop, a clothing store, a park, a shopping mall, or the like. According to various embodiments, the server 120 may identify POIs that are along the route 102, within a predetermined distance from the route 102, and the like. In the example of FIG. 1A, the server 120 identifies a POI 132, a POI 134, and a POI 136 that are near the route 102.

In addition, the server 120 may identify charging stations that are nearest the POIs. In the example of FIG. 1A, the server 120 identifies a charging station 142 nearest the POI 132, a charging station 144 that is nearest the POI 134, and a charging station 146 that is nearest the POI 136. Here, the server 120 may also identify GPS coordinates of the POIs and the charging stations and provide the GPS coordinates to the vehicle 110. Here, the software application installed on the vehicle may receive the GPS coordinates of the POIs 132, 134, and 136, and the charging stations 142, 144, and 146, and display identifiers of the POIs and the charging stations on a display device of the vehicle 110. In addition, the server 120 may identify attributes associated with the POIs including whether acquaintances are present at the POIs, weather conditions, activities that can be performed by the occupant at the POIs, and the like.

The vehicle 110 may also determine a state of charge (SOC) of a battery installed in the vehicle 110. The vehicle 110 may receive the GPS coordinates from the server 120 and determine distances between the POIs (e.g., the POI 132, the POI 134, and the POI 136) and a current location of the vehicle 110, distances between the charging stations (e.g., the charging station 142, the charging station 144, and the charging station 146) and the vehicle 110, distances between the POIs and the charging stations, respectively, and the like. For example, the vehicle 110 may determine a distance between the POI 132 and the corresponding charging station 142. The SOC, the distances, the attributes, and the current location of the vehicle 110 may be used to determine an optimal charging station from among the charging station 142, the charging station 144, and the charging station 146.

Figure 1B:
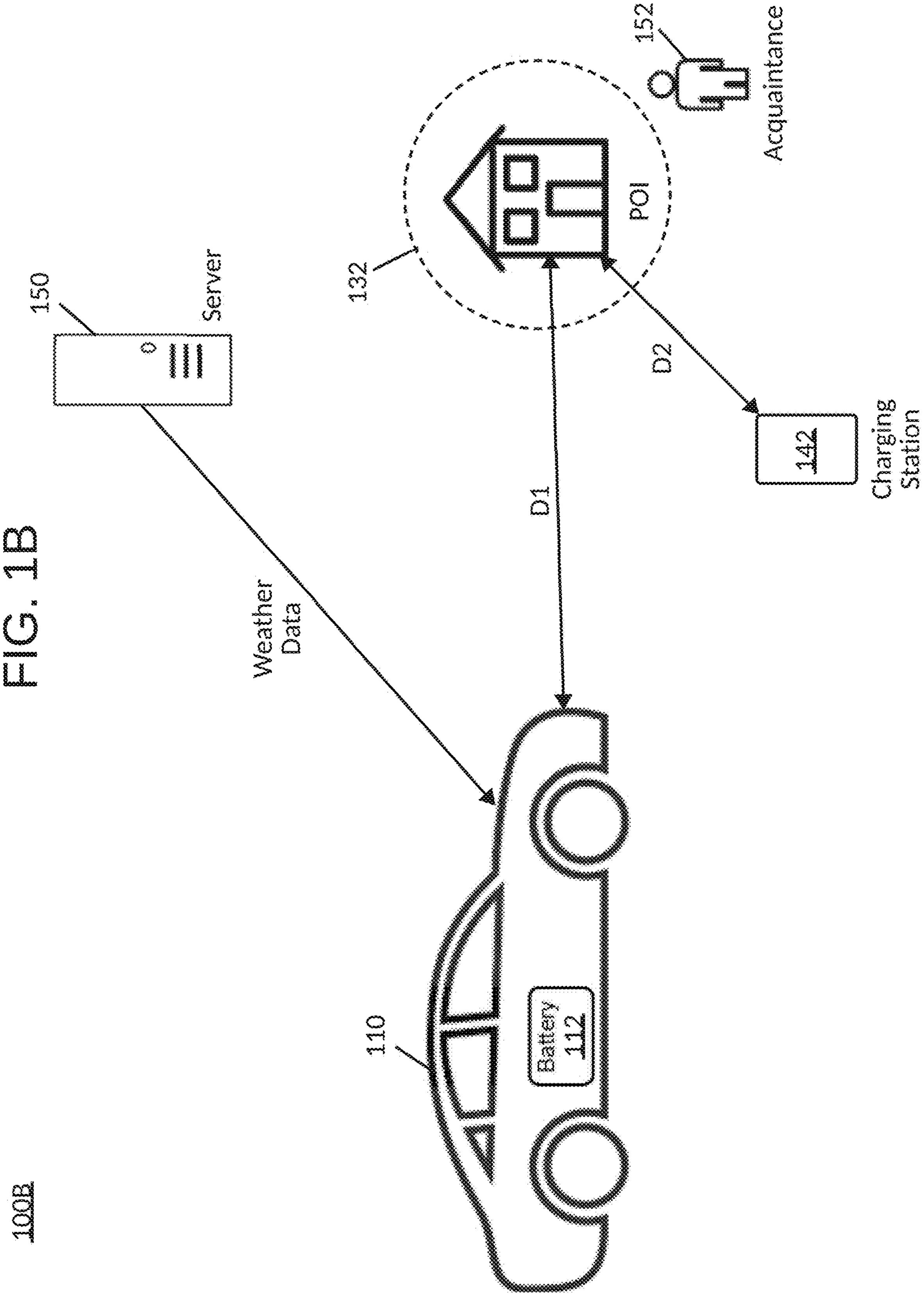
FIG. 1B is a diagram illustrating a process of identifying attributes of a POI and of a vehicle according to an example of the instant solution.

FIG. 1B illustrates a process 100B of identifying attributes of the POI 132 and of the vehicle 110 according to an example of the instant solution. Referring to FIG. 1B, the vehicle 110 may determine a state of charge of a battery 112 installed within the vehicle 110 based on at least one sensor that is capable of measuring a density of electrolyte via a hydrometer, or the like. The state of charge represents how much charge is still left in the battery 112 with respect to a total charge capacity of the battery 112 of the vehicle 110. For example, the charge capacity may be a ratio (e.g., 50%), or the like.

In some embodiments, the vehicle 110 may query the POI 132 (e.g., a computing system, server, etc.) at the POI 132 for attributes of the POI 132. For example, the vehicle 110 may transmit an identifier of an occupant of the vehicle 110 to the POI 132. In response, the POI 132 may determine whether any "acquaintances" of the occupant (e.g., links, friends, connections, etc.) within the software application are currently at the POI 132. The POI 132 may transmit identifiers of any acquaintances of the occupant that are identified to the vehicle 110. As another example, the POI 132 may provide identifiers of any activities that are available for the occupant at the POI 132. In addition, the vehicle 110 may query a server 150, such as a weather service, or the like, with the GPS coordinates of the POIs and the charging stations and receive forecasted weather information for geographical areas of the POIs and the charging stations.

In the example of FIG. 1B, the POI 132 identifies an acquaintance 152 of the occupant of the vehicle 110 which is present at the POI 132 (e.g., within a predetermined distance from the POI 132, etc.) Here, the POI 132 may also include a copy of the software application and may identify acquaintances of the occupant within the software application. Here, the POI 132 may use the GPS locations of acquaintances of the occupant to determine if any of the acquaintances are currently present.

Figure 1C:
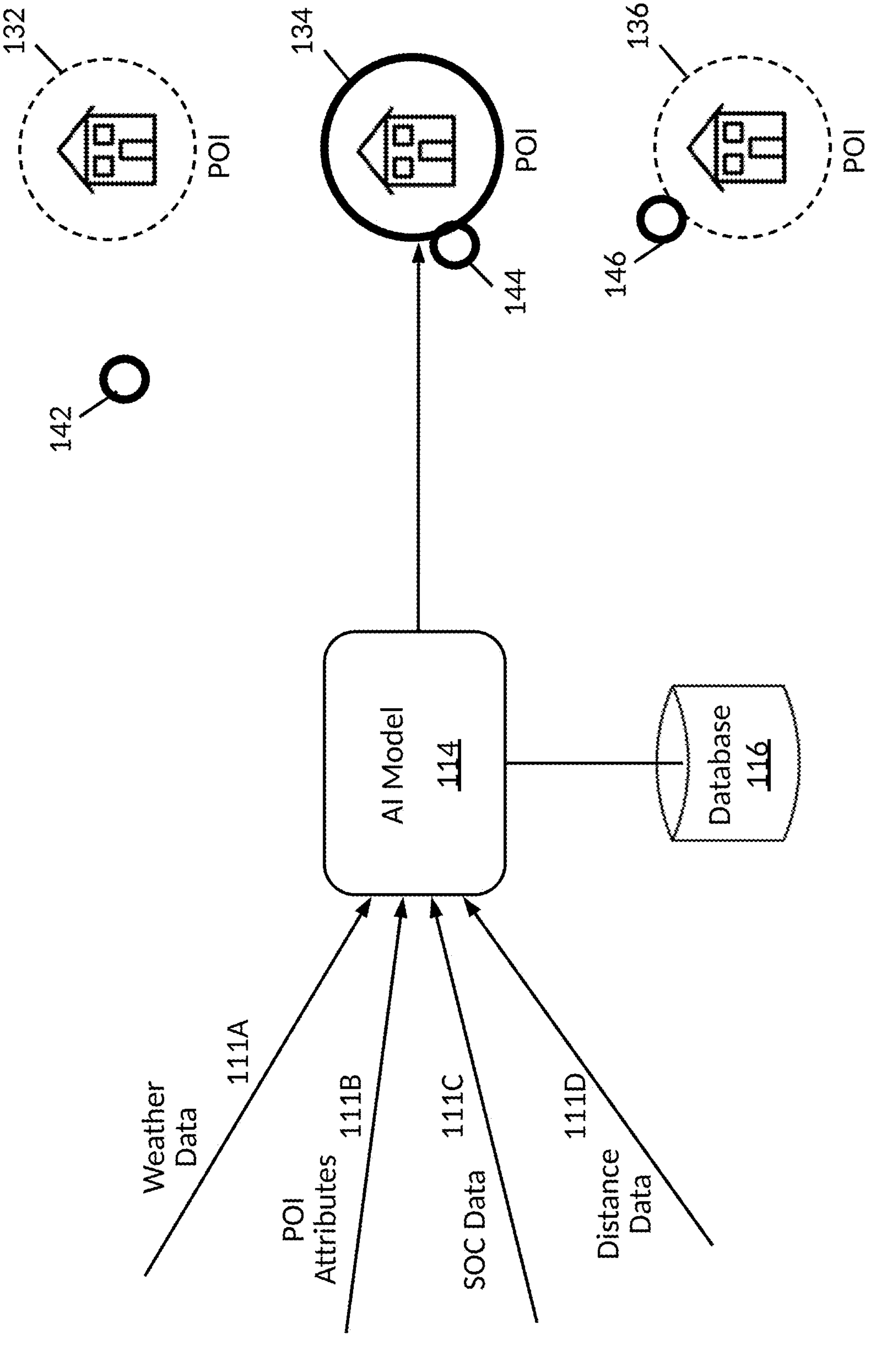
FIG. 1C is a diagram illustrating a process of determining an optimal charging station based on an artificial intelligence (AI) model according to an example of the instant solution.

FIG. 1C illustrates a process 100C of determining an optimal charging station based on an artificial intelligence (AI) model according to an example of the instant solution. According to various embodiments, the vehicle 110 may include an artificial intelligence (AI) model 114 (or multiple AI models) which are capable of receiving the attributes of the POIs 111B, a current location of the vehicle, the SOC of the vehicle 111C, the distances to the POIs 111D and charging stations, the weather data 111A, the activities, etc. and determine an optimal charging station from among the charging station 142, the charging station 144, and the charging station 146.

In this example, the AI model 114 may consider a distance between the respective POI and the nearest charging station when determining the most optimal charging station. As another example, the AI model 114 may consider whether any acquaintances of the occupant are present at the POI, weather conditions at the POI, activities available at the POI, an SOC of the vehicle, and the like. Here, the AI model 114 may be trained to identify the most optimal charging station based on historical charging stations used by the occupant on previous trips. The historical charging stations and their locations, time of day they were used, etc. may be stored within a database 116 and ingested by the AI model 114. All of this information may be considered by the AI model 114 to select an optimum charging station (e.g., the charging station 144 corresponding to the POI 134).

Figure 1D:
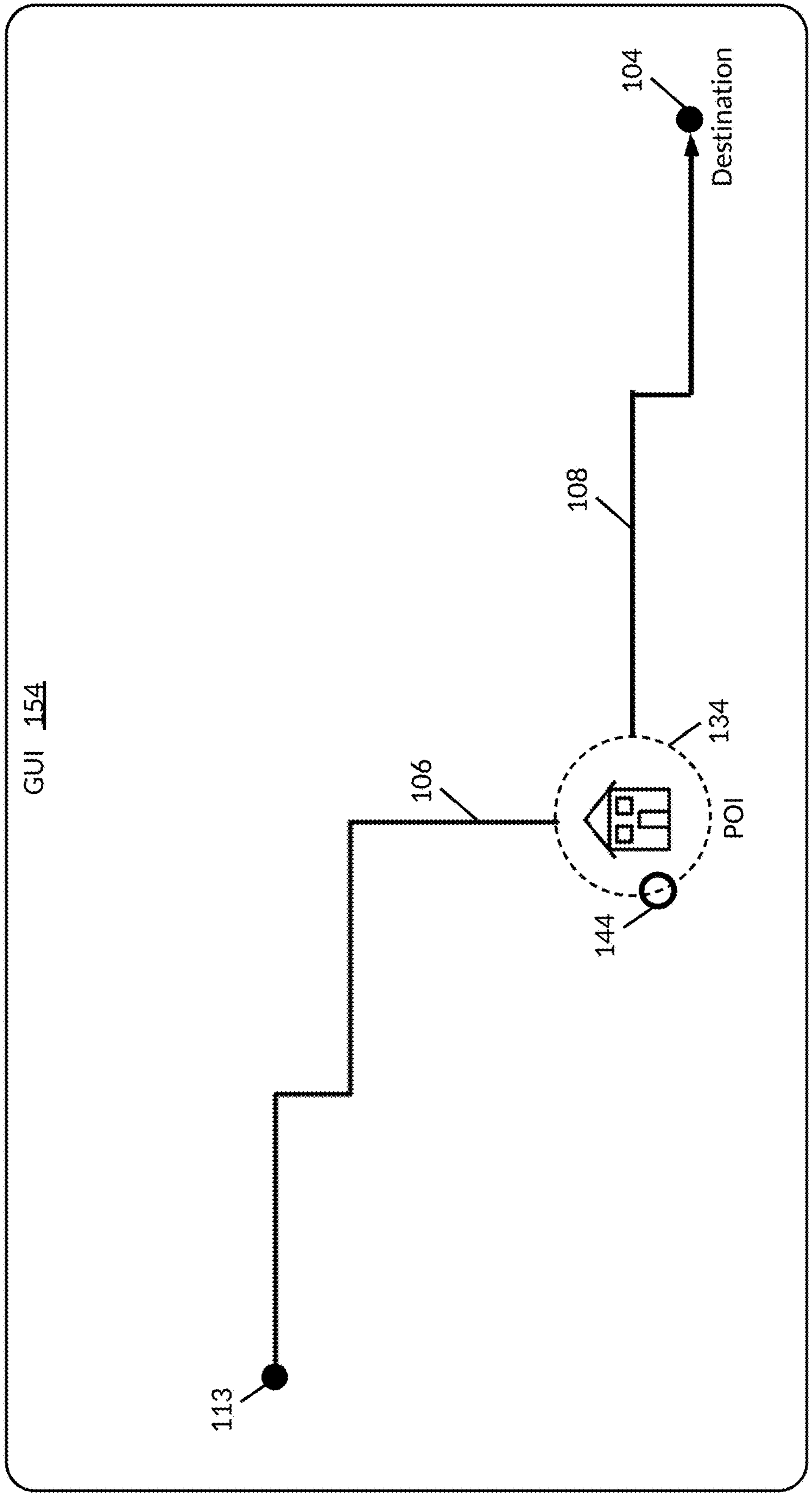
FIG. 1D is a diagram illustrating a process of rerouting the vehicle to the optimal charging station according to an example of the instant solution.

FIG. 1D illustrates a process 100D of rerouting the vehicle 110 to the optimal charging station 144 according to an example of the instant solution. Referring to FIG. 1D, in response to determining the optimum charging station as the charging station 144, the vehicle 110 may automatically reroute the vehicle 110 along a new route 106 to the optimum charging station. For example, the AI model 114 may output an identifier of the optimum charging station within the software application which is then fed to a navigation system of the vehicle 110. The navigation system may query GPS sensors of the vehicle 110 for the current location of the vehicle 110, and generate instructions from travelling from the current location of the vehicle 110 to the location of the optimum charging station. The instructions may be output on a GUI 154 as shown in FIG. 1D.

The GUI 154 may include a map with routing information therein identifying the new route 106 of travel for the vehicle 110 to get to the optimum charging station. The GUI 154 may include other instructions such as descriptions on movements to make, turns to take, distances to travel on particular roads, etc. from starting point 113. In addition, the navigation system may also generate an alternate route 108 to the destination 104 from the optimum charging station enabling the vehicle 110 to keep its original destination 104 based on the additional/new stop at the charging station 144.

In some embodiments, rather than rerouting the vehicle 110, the vehicle 110 may be an autonomous vehicle. Here, the software application may control an advanced driver-assistance system (ADAS) system of the vehicle 110 to maneuver autonomously to the optimum charging station using sensors of the vehicle, an autonomous driving system, brakes, turn signals, and the like.

Figure 1E:
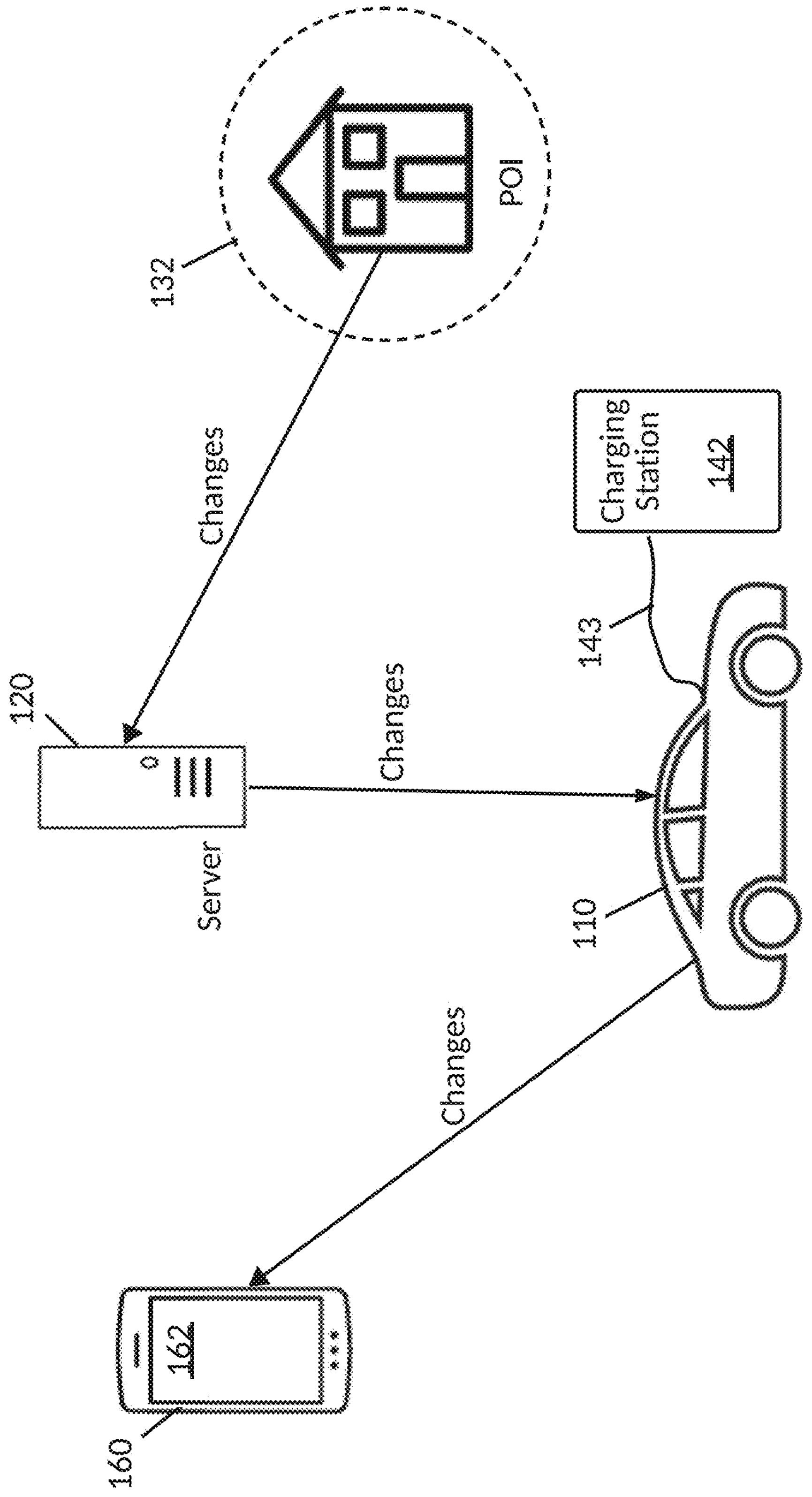
FIG. 1E is a diagram illustrating a process of detecting changes during a charging operation of a vehicle and notifying an occupant who has left the vehicle about the changes according to an example of the instant solution.

FIG. 1E illustrates a process 100E of detecting changes during a charging operation of a vehicle and notifying an occupant who has left the vehicle about the changes according to an example of the instant solution. According to various embodiments, an occupant may connect/pair a mobile device 160 to the vehicle 110 (e.g., an infotainment system of the vehicle, etc.). The pairing process may be performed through Bluetooth®, Wi-Fi®, or the like. Here, the vehicle 110 is now connected to the charging station 142 via a cable 143, and is receiving charge from the charging station 142. The charging operation may take minutes, hours, etc. During this time, the occupant may leave the vehicle 110. For example, the occupant may leave the vehicle to visit an activity or other interest at or near the POI 132.

The vehicle 110 may detect that the occupant has left the vehicle 110 based on GPS coordinates of the mobile device 160. In this example, the mobile device 160 may also include a copy of the software application installed therein. Here, the vehicle 110 may communicate with the mobile device 160 through a network and using the software application.

According to various embodiments, the charging station 142 may make changes to attributes therein such as changes to charging prices, or the like. In this example, the charging station 142 may publish the changes to the server 120. In response, the server 120 may transmit the changes to the vehicle 110. Here, the vehicle 110 may detect that the mobile device 160 is not in the vehicle 110 and may transmit the changes to the mobile device 160. The mobile device 160 may display the changes on a display device 162 of the mobile device 160. Thus, the occupant may be notified of the changes that have occurred even while the occupant is not present at the charging station 142.

Although the flow diagrams depicted herein, such as FIG. 2C, FIG. 2D, FIG. 2E, and FIG. 2F, may be presented as separate flow diagrams, the steps depicted therein may be utilized in conjunction with one another with departing from the scope of the instant solution. Any of the operations in one flow diagram may be utilized and shared with another flow diagram. No example operation is intended to limit the subject matter of any feature, structure, or characteristic of the instant solution or corresponding claim.

It is important to note that all the flow diagrams and corresponding steps and processes derived from FIG. 2C, FIG. 2D, FIG. 2E, and FIG. 2F may be part of a same process or may share sub-processes/steps with one another thus making the diagrams combinable into a single preferred configuration that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
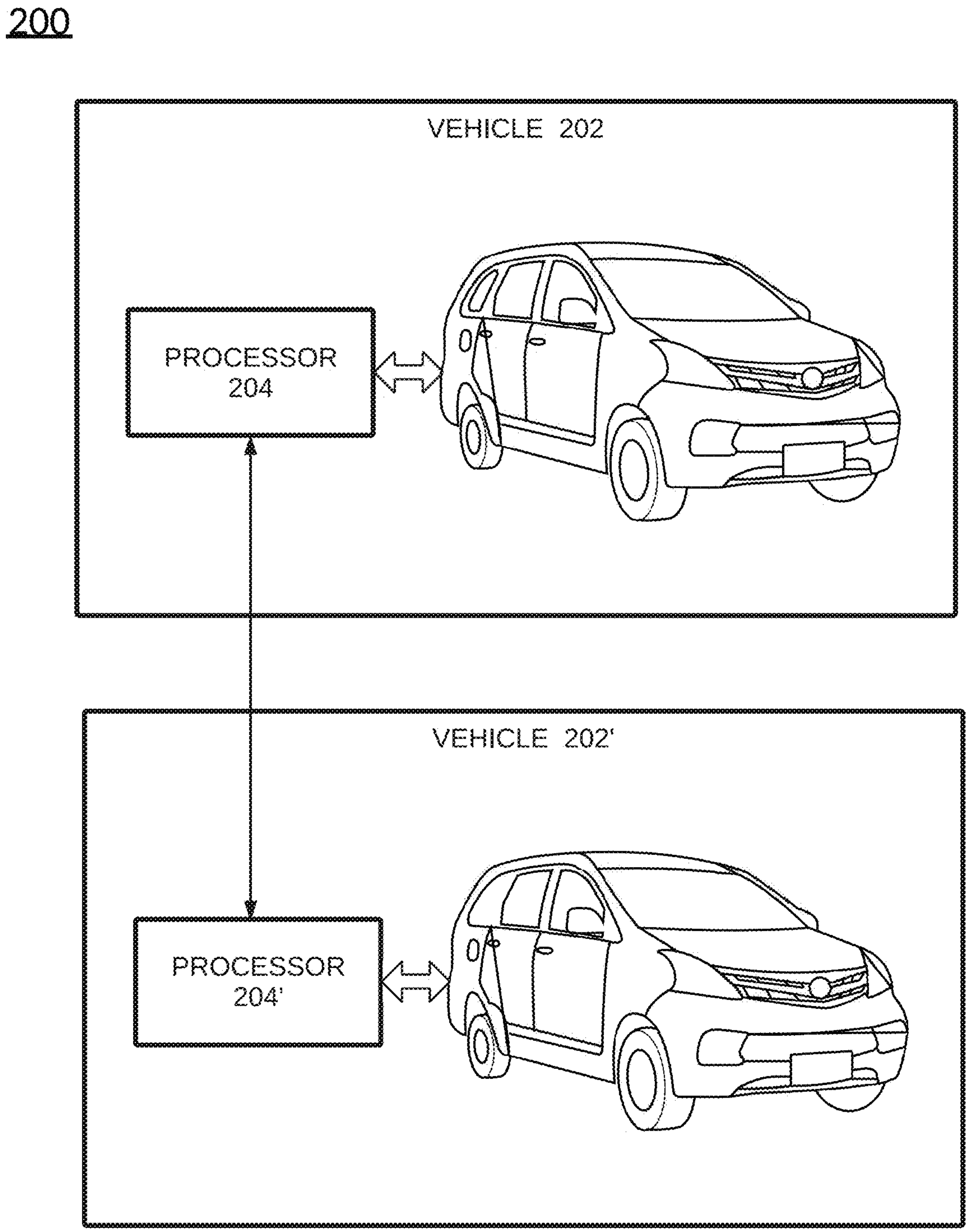
FIG. 2A illustrates a vehicle network diagram, according to an example of the instant solution.

FIG. 2A illustrates a vehicle network diagram 200, according to the instant solution. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and/or software. Although depicted as single vehicles and processors, a plurality of vehicles and processors may be present. One or more of the applications, features, steps, solutions, etc., described and/or depicted herein may be utilized and/or provided by the instant elements.

Figure 2B:
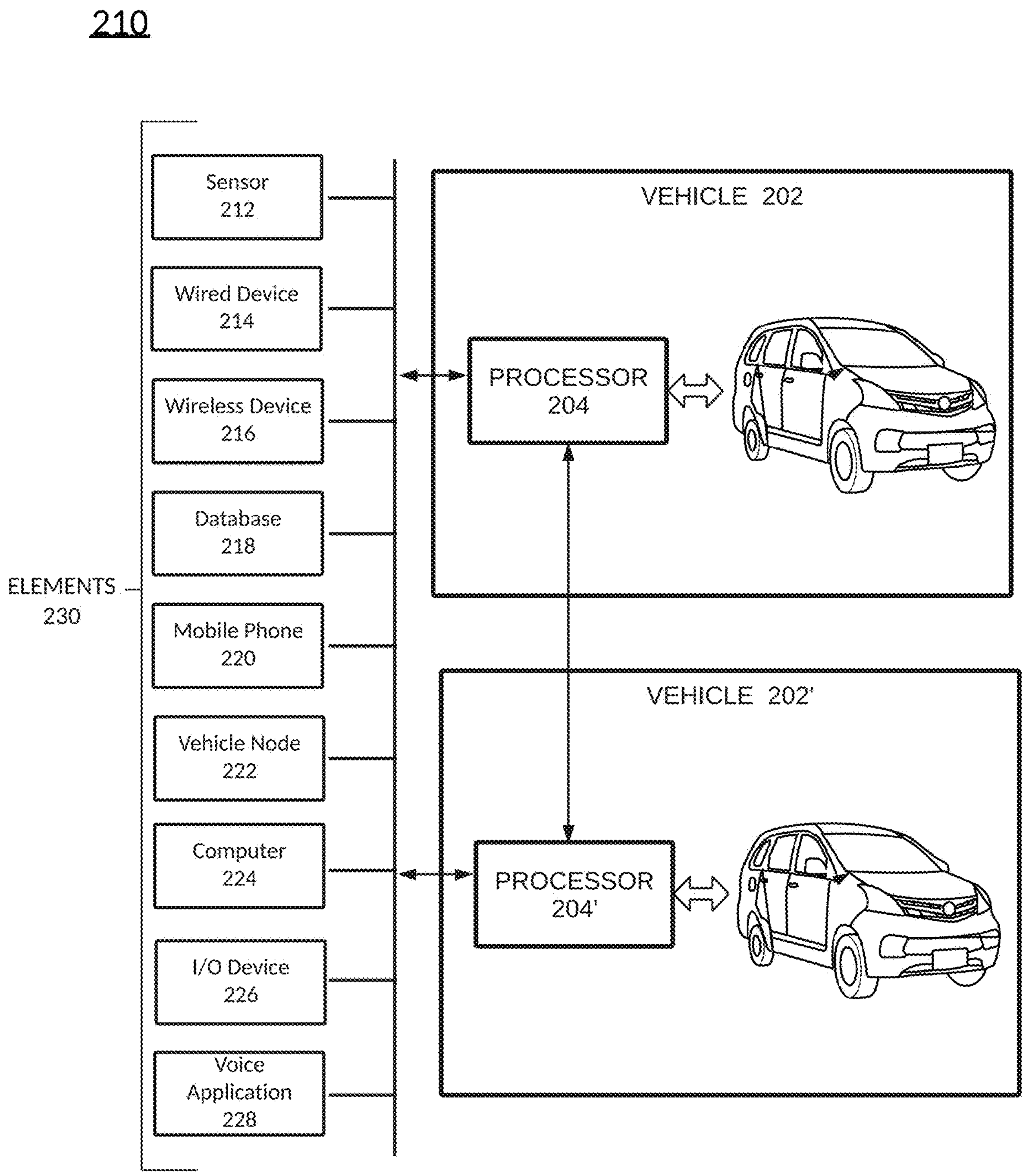
FIG. 2B illustrates another vehicle network diagram, according to an example of the instant solution.

FIG. 2B illustrates another vehicle network diagram 210, according to the instant solution. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle node 222, computer 224, input/output (I/O) device 226, and voice application 228. The processors 204, 204' can further communicate with elements comprising one or more of a processor, memory, and/or software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, and may further provide the information or additional information to the mobile phone 220, the vehicle 222, and/or the computer 224. One or more of the applications, features, steps, solutions, etc., described and/or depicted herein may be utilized and/or provided by the instant elements.

Figure 2C:
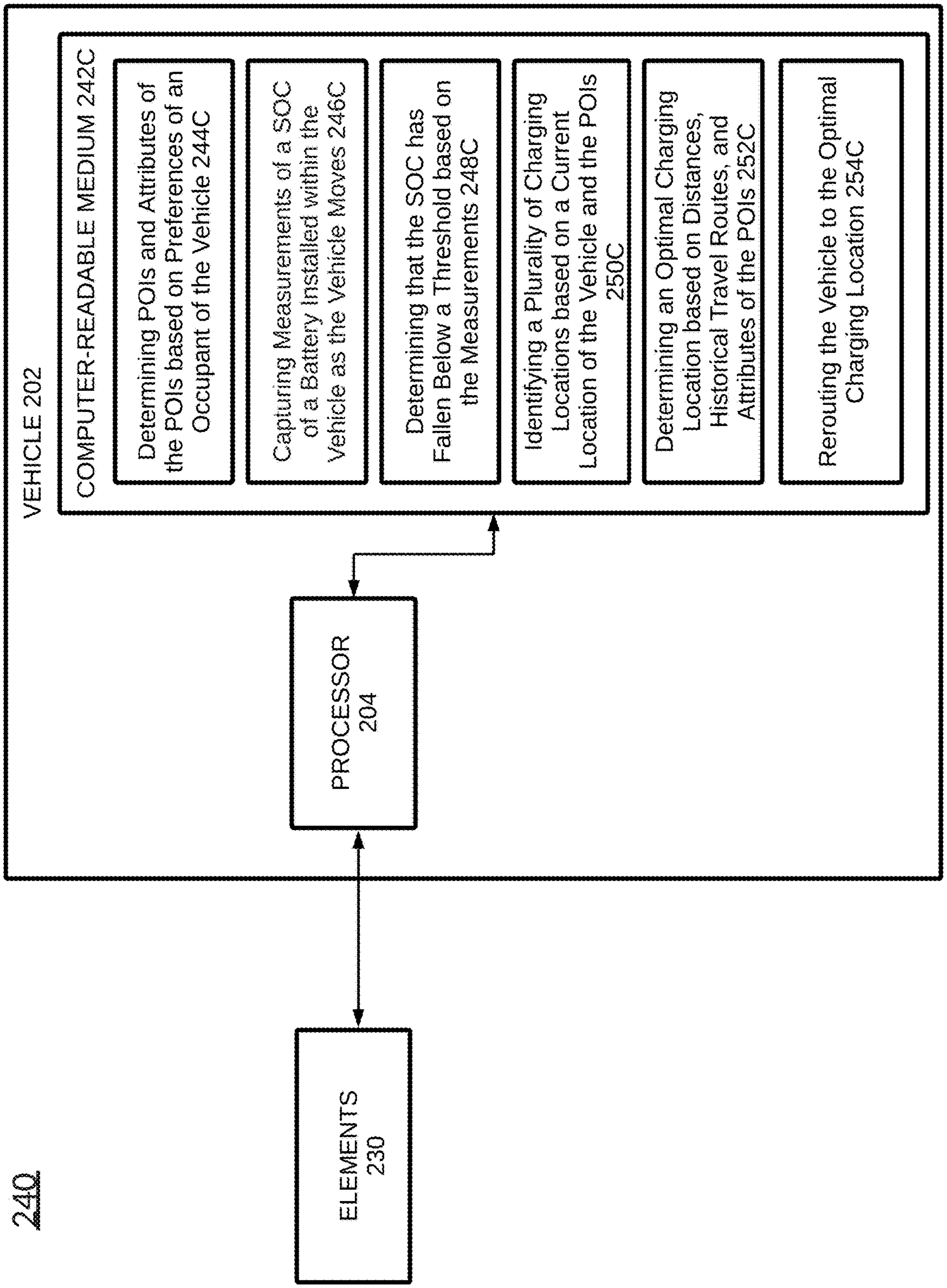
FIG. 2C illustrates yet another vehicle network diagram, according to an example of the instant solution.

FIG. 2C illustrates yet another vehicle network diagram 240, according to the instant solution. The network comprises elements including a vehicle 202, a processor 204, and a non-transitory computer-readable storage medium 242C. The processor 204 is communicably coupled to the non-transitory computer-readable storage medium 242C and elements 230 (which were depicted in FIG. 2B). The vehicle 202 may be a vehicle, server, or any device with a processor and memory.

The processor 204 performs one or more of determining, by a vehicle, points of interest (POIs) and attributes of the POIs based on preferences of an occupant of the vehicle in 244C, capturing measurements, by the vehicle, of a state of charge (SOC) of a battery installed within the vehicle as the vehicle moves along a route in 246C, determining that the SOC of the battery has fallen below a threshold based on the measurements in 248C, identifying, by the vehicle, a plurality of charging stations based on a current location of the vehicle and the POIs in 250C, determining, by the vehicle, an optimal charging station among the plurality of charging stations based on distances from the current location of the vehicle to the plurality of charging stations, historical travel routes of the vehicle, and the attributes of the POIs in 252C, and routing, by the vehicle, the vehicle to the optimal charging station in 254C.

Figure 2D:
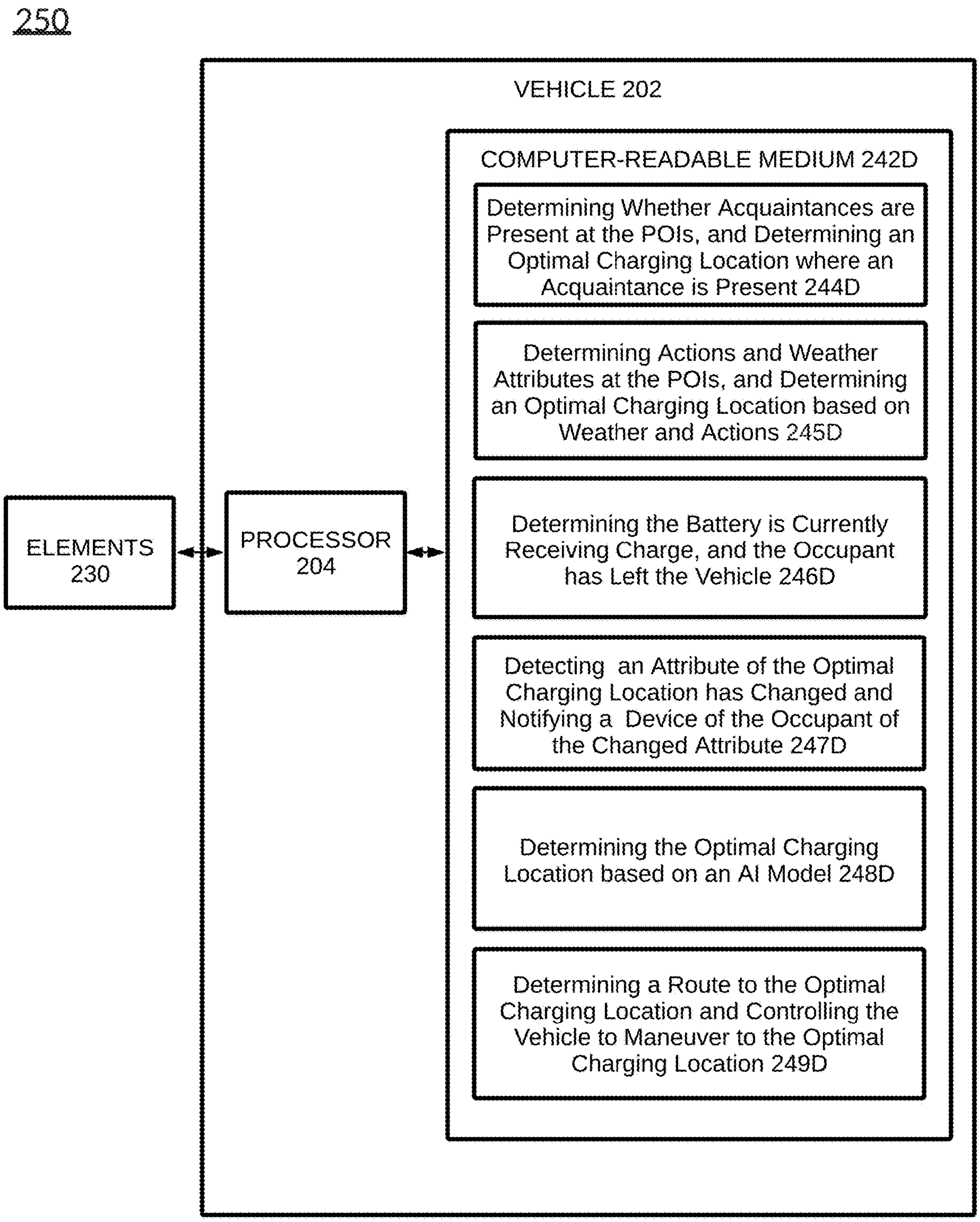
FIG. 2D illustrates a further vehicle network diagram, according to an example of the instant solution.

FIG. 2D illustrates a further vehicle network diagram 250, according to the instant solution. The network comprises elements including a vehicle 202, a processor 204, and a non-transitory computer-readable storage medium 242D. The processor 204 is communicably coupled to the non-transitory computer-readable storage medium 242D and elements 230 (which were depicted in FIG. 2B). The vehicle 202 may be a vehicle, server or any device with a processor and memory.

The processor 204 performs one or more of determining whether acquaintances of the occupant are currently present at the POIs, and identifying a POI where an acquaintance of the occupant is currently present and identifying a charging location at the POI as the optimal charging station in 244D, determining activities that occur at the POIs and weather conditions at the POIs, and determining the optimal charging station based on the activities that occur at the POIs and the weather conditions at the POIs in 245D, detecting that the battery is currently receiving charge from the optimal charging station, and determining that the occupant of the vehicle has left the vehicle based on global positioning system (GPS) coordinates from a mobile device of the occupant in 246D, detecting that an attribute of the optimal charging station has changed based on a data feed from the optimal charging station, and transmitting a notification about the attribute that has changed to the mobile device of the occupant in 247D, determining the optimal charging station based on execution of an artificial intelligence (AI) model on the current location of the vehicle, the plurality of charging stations, historical travel routes of the vehicle, and the attributes of the POIs in 248D, and determining a route from the current location of the vehicle to the optimal charging station and controlling the vehicle to maneuver from the current location to a location of the optimal charging station based on an ADAS of the vehicle in 249D.

While this example describes in detail only one vehicle 202, multiple such nodes may be connected, such as via a network or blockchain. It should be understood that the vehicle 202 may include additional components and that some of the components described herein may be removed and/or modified without departing from the scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the vehicle 202 may include multiple processors, multiple cores, or the like without departing from the scope of the instant application. The vehicle 202 may be a vehicle, server or any device with a processor and memory.

The processors and/or computer-readable storage medium may fully or partially reside in the interior or exterior of the vehicles. The steps or features stored in the computer-readable storage medium may be fully or partially performed by any of the processors and/or elements in any order. Additionally, one or more steps or features may be added, omitted, combined, performed at a later time, etc.

Figure 2E:
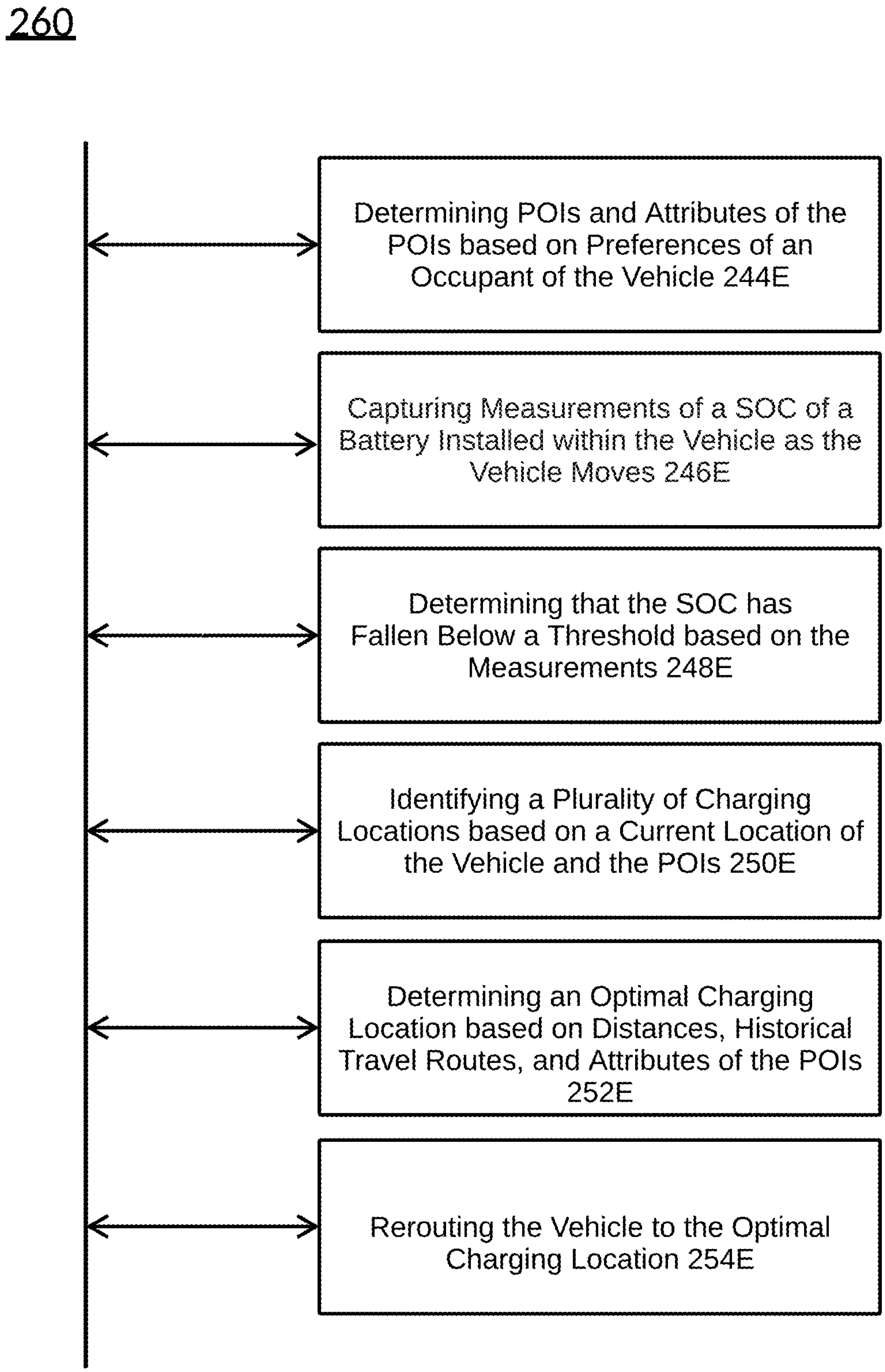
FIG. 2E illustrates a flow diagram, according to an example of the instant solution.

FIG. 2E illustrates a flow diagram 260, according to the instant solution. Referring to FIG. 2E, the instant solution includes one or more of determining, by a vehicle, points of interest (POIs) and attributes of the POIs based on preferences of an occupant of the vehicle in 244E, capturing measurements, by the vehicle, of a state of charge (SOC) of a battery installed within the vehicle as the vehicle moves along a route in 246E, determining that the SOC of the battery has fallen below a threshold based on the measurements in 248E, identifying, by the vehicle, a plurality of charging stations based on a current location of the vehicle and the POIs in 250E, determining, by the vehicle, an optimal charging station among the plurality of charging stations based on distances from the current location of the vehicle to the plurality of charging stations, historical travel routes of the vehicle, and the attributes of the POIs in 252E, and routing, by the vehicle, the vehicle to the optimal charging station in 254E.

Figure 2F:
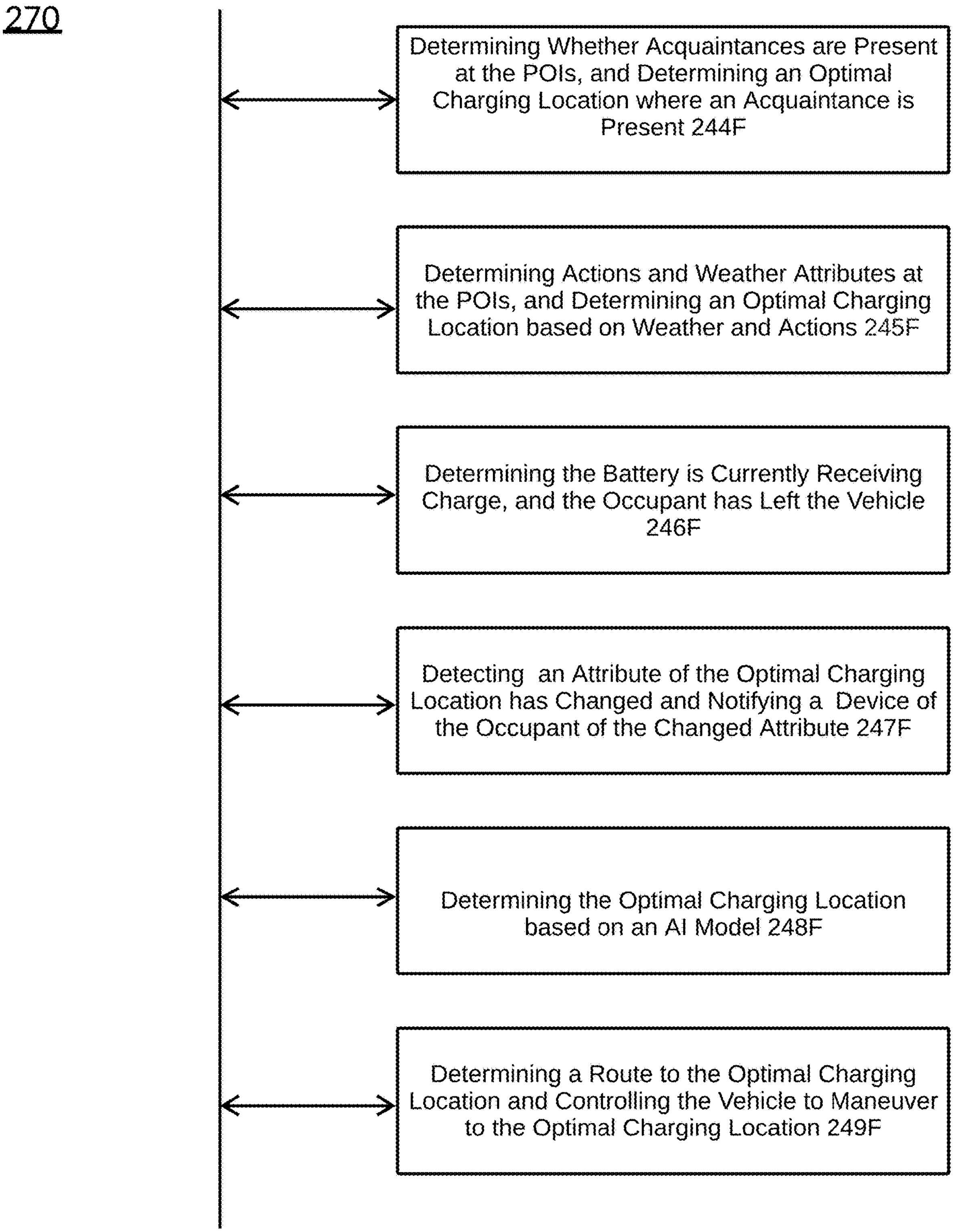
FIG. 2F illustrates another flow diagram, according to an example of the instant solution.

FIG. 2F illustrates another flow diagram 270, according to the instant solution. Referring to FIG. 2F, the instant solution includes one or more of determining whether acquaintances of the occupant are currently present at the POIs, and identifying a POI where an acquaintance of the occupant is currently present and identifying a charging station at the POI as the optimal charging station in 244F, determining activities that occur at the POIs and weather conditions at the POIs, and determining the optimal charging station based on the activities that occur at the POIs and the weather conditions at the POIs in 245F, detecting that the battery is currently receiving charge from the optimal charging station, and determining that the occupant of the vehicle has left the vehicle based on global positioning system (GPS) coordinates from a mobile device of the occupant in 246F, detecting that an attribute of the optimal charging station has changed based on a data feed from the optimal charging station, and transmitting a notification about the attribute that has changed to the mobile device of the occupant in 247F, determining the optimal charging station based on execution of an artificial intelligence (AI) model on the current location of the vehicle, the plurality of charging stations, historical travel routes of the vehicle, and the attributes of the POIs in 248F, and determining a route from the current location of the vehicle to the optimal charging station and controlling the vehicle to maneuver from the current location to a location of the optimal charging station based on an advanced driver-assistance system (ADAS) of the vehicle in 249F.

Technological advancements typically build upon the fundamentals of predecessor technologies; such is the case with Artificial Intelligence (AI) models. An AI classification system describes the stages of AI progression. The first classification is known as "Reactive Machines," followed by present-day AI classification "Limited Memory Machines" (also known as "Artificial Narrow Intelligence"), then progressing to "Theory of Mind" (also known as "Artificial General Intelligence"), and reaching the AI classification "Self-Aware" (also known as "Artificial Superintelligence"). Present-day Limited Memory Machines are a growing group of AI models built upon the foundation of its predecessor, Reactive Machines. Reactive Machines emulate human responses to stimuli; however, they are limited in their capabilities as they cannot typically learn from prior experience. Once the AI model's learning abilities emerged, its classification was promoted to Limited Memory Machines. In this present-day classification, AI models learn from large volumes of data, detect patterns, solve problems, generate and predict data, and the like, while inheriting all of the capabilities of Reactive Machines. Examples of AI models classified as Limited Memory Machines include, but are not limited to, Chatbots, Virtual Assistants, Machine Learning (ML), Deep Learning (DL), Natural Language Processing (NLP), Generative AI (GenAI) models, and any future AI models that are yet to be developed possessing characteristics of Limited Memory Machines. Generative AI models combine Limited Memory Machine technologies, incorporating ML and DL, forming the foundational building blocks of future AI models. For example, Theory of Mind is the next progression of AI that may be able to perceive, connect, and react by generating appropriate reactions in response to an entity with which the AI model is interacting; all of these capabilities rely on the fundamentals of Generative AI. Furthermore, in an evolution into the Self-Aware classification, AI models will be able to understand and evoke emotions in the entities they interact with, as well as possess their own emotions, beliefs, and needs, all of which rely on the Generative AI fundamentals of learning from experiences to generate and draw conclusions about itself and its surroundings. Generative AI models are integral and core to future artificial intelligence models. As described herein, Generative AI refers to present-day Generative AI models and future AI models.

Figure 3A:
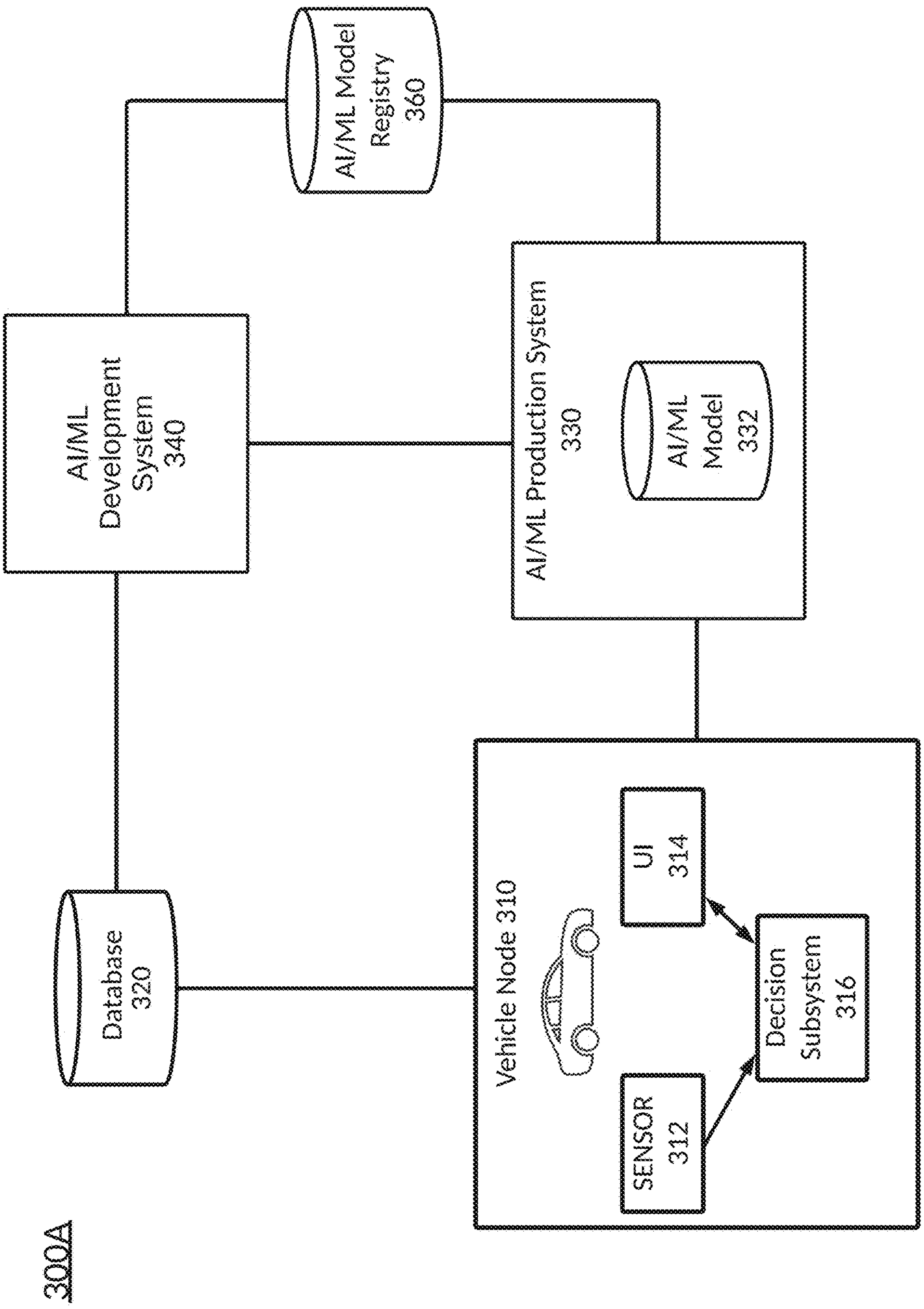
FIG. 3A illustrates an Artificial Intelligence (AI)/Machine Learning (ML) network diagram for integrating an artificial intelligence (AI) model into any decision point in an example of the instant solution.

FIG. 3A illustrates an AI/ML network diagram 300A that supports AI-assisted vehicle or occupant decision points.

Vehicle node 310 may include a plurality of sensors 312 that may include but are not limited to, light sensors, weight sensors, cameras, LiDAR, and radar. In some configurations of the instant solution, these sensors 312 send data to a database 320 that stores data about the vehicle and occupants of the vehicle. In some configurations of the instant solution, these sensors 312 send data to one or more decision subsystems 316 in vehicle node 310 to assist in decision-making.

Vehicle node 310 may include one or more user interfaces (UIs) 314, such as a steering wheel, navigation controls, audio/video controls, temperature controls, etc. In some configurations of the instant solution, these UIs 314 send data to a database 320 that stores event data about the UIs 314 that includes but is not limited to selection, state, and display data. In some configurations of the instant solution, these UIs 314 send data to one or more decision subsystems 316 in vehicle node 310 to assist decision-making.

Vehicle node 310 may include one or more decision subsystems 316 that drive a decision-making process around, but not limited to, vehicle control, temperature control, charging control, etc. In some configurations of the instant solution, the decision subsystems 316 gather data from one or more sensors 312 to aid in the decision-making process. In some configurations of the instant solution, a decision subsystem 316 may gather data from one or more UIs 314 to aid in the decision-making process. In some configurations of the instant solution, a decision subsystem 316 may provide feedback to a UI 314.

An AI/ML production system 330 may be used by a decision subsystem 316 in a vehicle node 310 to assist in its decision-making process. The AI/ML production system 330 includes one or more AI/ML models 332 that are executed to retrieve the needed data, such as, but not limited to, a prediction, a categorization, a UI prompt, etc. In some configurations of the instant solution, an AI/ML production system 330 is hosted on a server. In some configurations of the instant solution, the AI/ML production system 330 is cloud-hosted. In some configurations of the instant solution, the AI/ML production system 330 is deployed in a distributed multi-node architecture. In some configurations of the instant solution, the AI production system resides in vehicle node 310.

An AI/ML development system 340 creates one or more AI/ML models 332. In some configurations of the instant solution, the AI/ML development system 340 utilizes data in the database 320 to develop and train one or more AI models 332. In some configurations of the instant solution, the AI/ML development system 340 utilizes feedback data from one or more AI/ML production systems 330 for new model development and/or existing model re-training. In another configuration of the instant solution, the AI/ML development system 340 resides and executes on a server. In another configuration of the instant solution, the AI/ML development system 340 is cloud-hosted. In a further configuration of the instant solution, the AI/ML development system 340 utilizes a distributed data pipeline/analytics engine.

Once an AI/ML model 332 has been trained and validated in the AI/ML development system 340, it may be stored in an AI/ML model registry 360 for retrieval by either the AI/ML development system 340 or by one or more AI/ML production systems 330. The AI/ML model registry 360 resides in a dedicated server in one configuration of the instant solution. In some configurations of the instant solution, the AI/ML model registry 360 is cloud-hosted. The AI/ML model registry 360 is a distributed database in other examples of the instant solution. In further examples of the instant solution, the AI/ML model registry 360 resides in the AI/ML production system 330.

Figure 3B:
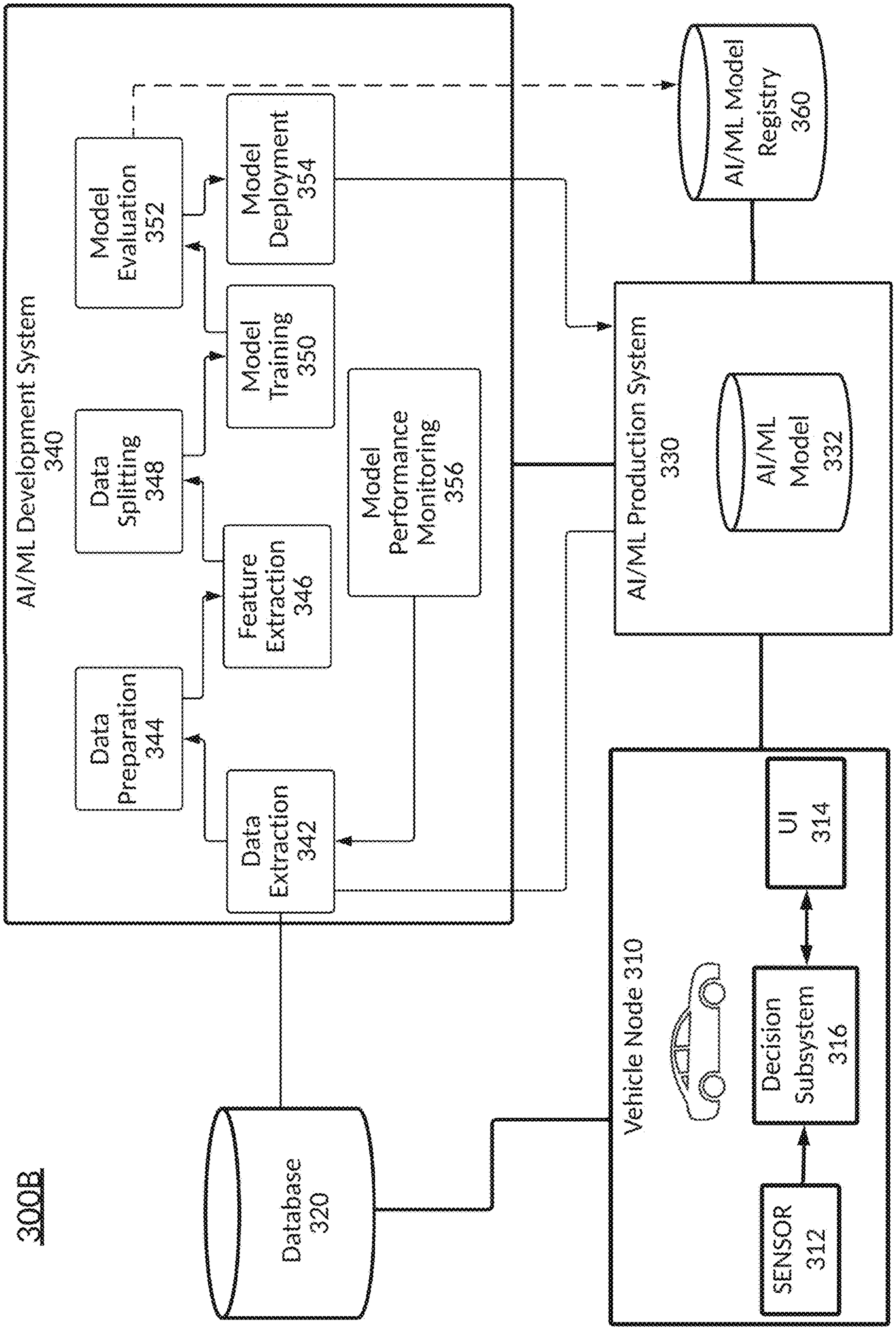
FIG. 3B illustrates a process for developing an Artificial Intelligence (AI)/Machine Learning (ML) model that supports AI-assisted vehicle or occupant decision points.

FIG. 3B illustrates a process 300B for developing one or more AI/ML models that support AI-assisted vehicle or occupant decision points. An AI/ML development system 340 executes steps to develop an AI/ML model 332 that begins with data extraction 342, in which data is loaded and ingested from one or more data sources. In some examples of the instant solution, vehicle and user data is extracted from a database 320. In some examples of the instant solution, model feedback data is extracted from one or more AI/ML production systems 330.

Once the required data has been extracted 342, it must be prepared 344 for model training. In some examples of the instant solution, this step involves statistical testing of the data to see how well it reflects real-world events, its distribution, the variety of data in the dataset, etc. In some examples of the instant solution, the results of this statistical testing may lead to one or more data transformations being employed to normalize one or more values in the dataset. In some examples of the instant solution, this step includes cleaning data deemed to be noisy. A noisy dataset includes values that do not contribute to the training, such as but not limited to, null and long string values. Data preparation 344 may be a manual process or an automated process using one or more of the elements and/or functions described or depicted herein.

Features of the data are identified and extracted 346. In some examples of the instant solution, a feature of the data is internal to the prepared data from step 344. In other examples of the instant solution, a feature of the data requires a piece of prepared data from step 344 to be enriched by data from another data source to be used in developing an AI/ML model 332. In some examples of the instant solution, identifying features is a manual process or an automated process using one or more of the elements and/or functions described or depicted herein. Once the features have been identified, the values of the features are collected into a dataset that will be used to develop the AI/ML model 332.

The dataset output from feature extraction step 346 is split 348 into a training and a validation data set. The training data set is used to train the AI/ML model 332, and the validation data set is used to evaluate the performance of the AI/ML model 332 on unseen data.

The AI/ML model 332 is trained and tuned 350 using the training data set from the data splitting step 348. In this step, the training data set is fed into an AI/ML algorithm with an initial set of algorithm parameters. The performance of the AI/ML model 332 is then tested within the AI/ML development system 340 utilizing the validation data set from step 348. These steps may be repeated with adjustments to one or more algorithm parameters until the model's performance is acceptable based on various goals and/or results.

The AI/ML model 332 is evaluated 352 in a staging environment (not shown) that resembles the ultimate AI/ML production system 330. This evaluation uses a validation dataset to ensure the performance in an AI/ML production system 330 matches or exceeds expectations. In some examples of the instant solution, the validation dataset from step 348 is used. In other examples of the instant solution, one or more unseen validation datasets are used. In some examples of the instant solution, the staging environment is part of the AI/ML development system 340. In other examples of the instant solution, the staging environment is managed separately from the AI/ML development system 340. Once the AI/ML model 332 has been validated, it is stored in an AI/ML model registry 360, which can be retrieved for deployment and future updates. As before, in some configurations of the instant solution, the model evaluation step 352 is a manual process or an automated process using one or more of the elements and/or functions described or depicted herein.

Once an AI/ML model 332 has been validated and published to an AI/ML model registry 360, it may be deployed 354 to one or more AI/ML production systems 330. In some examples of the instant solution, the performance of deployed AI/ML models 332 is monitored 356 by the AI/ML development system 340. In some examples of the instant solution, AI/ML model 332 feedback data is provided by the AI/ML production system 330 to enable model performance monitoring 356. In some examples of the instant solution, the AI/ML development system 340 periodically requests feedback data for model performance monitoring 356. In some examples of the instant solution, model performance monitoring includes one or more triggers that result in the AI/ML model 332 being updated by repeating steps 342-354 with updated data from one or more data sources.

Figure 3C:
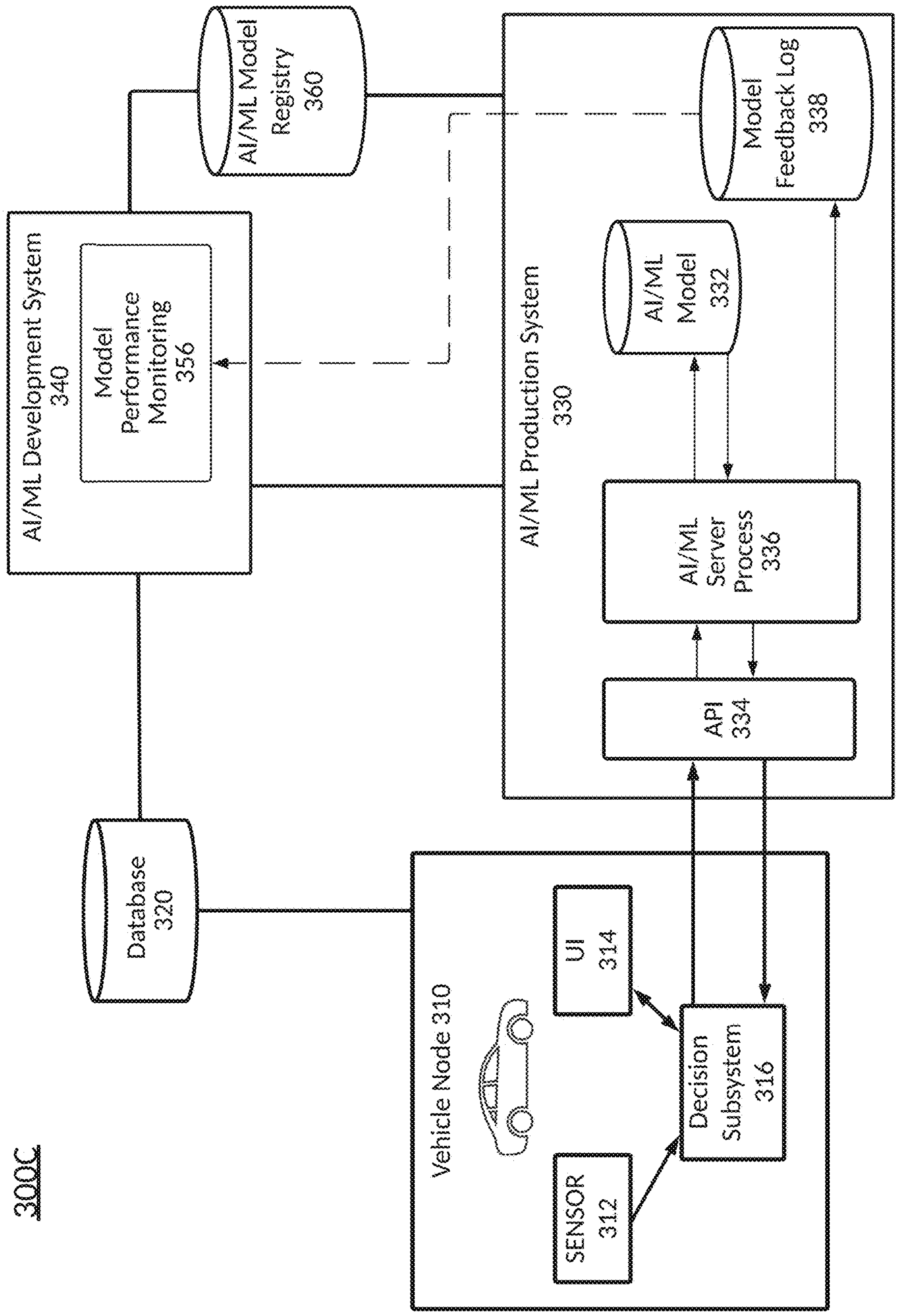
FIG. 3C illustrates a process for utilizing an Artificial Intelligence (AI)/Machine Learning (ML) model that supports AI-assisted vehicle or occupant decision points.

FIG. 3C illustrates a process 300C for utilizing an AI/ML model that supports AI-assisted vehicle or occupant decision points. As stated previously, the AI model utilization process depicted herein reflects ML, which is a particular branch of AI, but the instant solution is not limited to ML and is not limited to any AI algorithm or combination of algorithms.

Referring to FIG. 3C, an AI/ML production system 330 may be used by a decision subsystem 316 in vehicle node 310 to assist in its decision-making process. The AI/ML production system 330 provides an application programming interface (API) 334, executed by an AI/ML server process 336 through which requests can be made. In some examples of the instant solution, a request may include an AI/ML model 332 identifier to be executed. In some examples of the instant solution, the AI/ML model 332 to be executed is implicit based on the type of request. In some examples of the instant solution, a data payload (e.g., to be input to the model during execution) is included in the request. In some examples of the instant solution, the data payload includes sensor 312 data received from vehicle node 310. In some examples of the instant solution, the data payload includes UI 314 data from vehicle node 310. In some examples of the instant solution, the data payload includes data from other vehicle node 310 subsystems (not shown), including but not limited to, occupant data subsystems. In some examples of the instant solution, one or more elements or nodes 320, 330, 340, or 360 may be located in the vehicle node 310.

Upon receiving the API 334 request, the AI/ML server process 336 may need to transform the data payload or portions of the data payload to be valid feature values in an AI/ML model 332. Data transformation may include but is not limited to combining data values, normalizing data values, and enriching the incoming data with data from other data sources. Once any required data transformation occurs, the AI/ML server process 336 executes the appropriate AI/ML model 332 using the transformed input data. Upon receiving the execution result, the AI/ML server process 336 responds to the API caller, which is a decision subsystem 316 of vehicle node 310. In some examples of the instant solution, the response may result in an update to a UI 314 in vehicle node 310. In some examples of the instant solution, the response includes a request identifier that can be used later by the decision subsystem 316 to provide feedback on the AI/ML model 332 performance. Further, in some configurations of the instant solution, immediate performance feedback may be recorded into a model feedback log 338 by the AI/ML server process 336. In some examples of the instant solution, execution model failure is a reason for immediate feedback.

In some examples of the instant solution, the API 334 includes an interface to provide AI/ML model 332 feedback after an AI/ML model 332 execution response has been processed. This mechanism may be used to evaluate the performance of the AI/ML model 332 by enabling the API caller to provide feedback on the accuracy of the model results. For example, if the AI/ML model 332 provided an estimated time of arrival of 20 minutes, but the actual travel time was 24 minutes, that may be indicated. In some examples of the instant solution, the feedback interface includes the identifier of the initial request so that it can be used to associate the feedback with the request. Upon receiving a call into the feedback interface of API 334, the AI/ML server process 336 records the feedback in the model feedback log 338. In some examples of the instant solution, the data in this model feedback log 338 is provided to model performance monitoring 356 in the AI/ML development system 340. This log data is streamed to the AI/ML development system 340 in one example of the instant solution. In some examples of the instant solution, the log data is provided upon request. In some examples and features of the instant solution, the model feedback records in the model feedback log 338 are used as input for retraining the AI model 332.

Model retraining involves repeating steps 342-354 using the current data in the data source along with the model feedback log 338. In some examples and features of the instant solution, the AI model 332 is retrained periodically as a matter of business process to consider the latest data and/or retrained based on a trigger, such as, but not limited to, a recent model accuracy falling below a predetermined threshold. In some examples and features of the instant solution, the model feedback data 338 is used as input to determine the recent model accuracy.

A number of the steps/features that may utilize the AI/ML process described herein include one or more of: determining, by a vehicle, points of interest (POIs) and attributes of the POIs based on preferences of an occupant of the vehicle, capturing measurements, by the vehicle, of a state of charge (SOC) of a battery installed within the vehicle as the vehicle moves along a route, determining that the SOC of the battery has fallen below a threshold based on the measurements, identifying, by the vehicle, a plurality of charging stations based on a current location of the vehicle and the POIs, determining, by the vehicle, an optimal charging station among the plurality of charging stations based on distances from the current location of the vehicle to the plurality of charging stations, historical travel routes of the vehicle, and the attributes of the POIs, routing, by the vehicle, the vehicle to the optimal charging station, determining whether acquaintances of the occupant are currently present at the POIs, and identifying a POI where an acquaintance of the occupant is currently present and identifying a charging station at the POI as the optimal charging station, determining activities that occur at the POIs and weather conditions at the POIs, and determining the optimal charging station based on the activities that occur at the POIs and the weather conditions at the POIs, detecting that the battery is currently receiving charge from the optimal charging station, and determining that the occupant of the vehicle has left the vehicle based on global positioning system (GPS) coordinates from a mobile device of the occupant, detecting that an attribute of the optimal charging station has changed based on a data feed from the optimal charging station, and transmitting a notification about the attribute that has changed to the mobile device of the occupant, determining the optimal charging station based on execution of an artificial intelligence (AI) model on the current location of the vehicle, the plurality of charging stations, historical travel routes of the vehicle, and the attributes of the POIs, and determining a route from the current location of the vehicle to the optimal charging station and controlling the vehicle to maneuver from the current location to a location of the optimal charging station based on an advanced driver-assistance system (ADAS) of the vehicle.

Data associated with any of these steps/features, as well as any other features or functionality described or depicted herein, the AI/ML production system 330, as well as one or more of the other elements depicted in FIG. 3C may be used to process this data in a pre-transformation and/or post-transformation process. Data related to this process can be used by the vehicle node 310. In one example of the instant solution, data related to this process may be used with a charging infrastructure, such as charging station/charging point, a server, a wireless device, and/or any of the processors described or depicted herein.

Figure 3D:
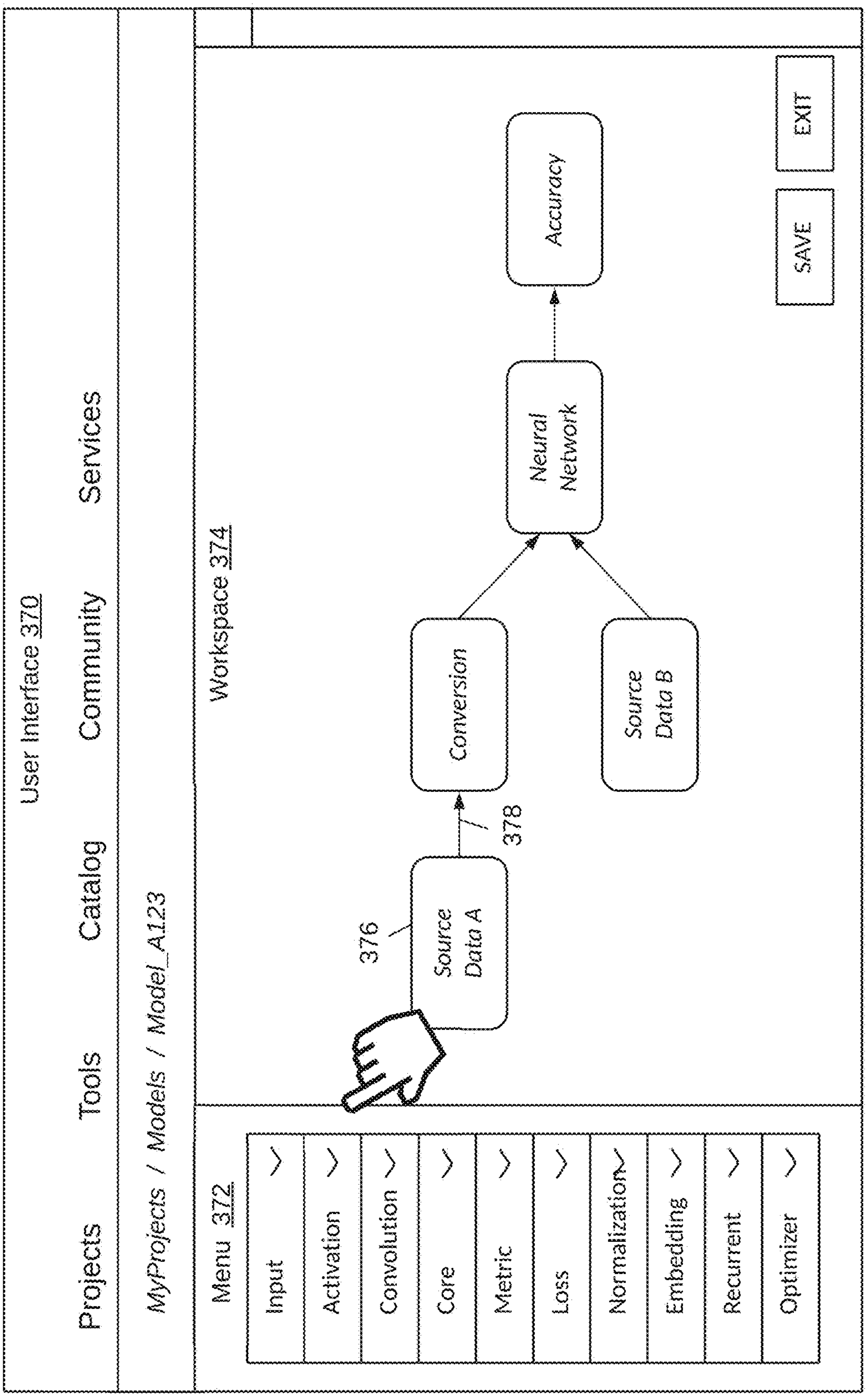
FIG. 3D illustrates a machine learning network diagram, according to an example of the instant solution.

FIG. 3D illustrates a process 300D of designing a new machine learning model via a user interface 370 of the system according to examples of the instant solution. As an example, a model may be output as part of the AI/ML Development System 340. Referring to FIG. 3D, a user can use an input mechanism from a menu 372 of a user interface 370 to add pieces/components to a model being developed within a workspace 374 of the user interface 370.

The menu 372 includes a plurality of graphical user interface (GUI) menu options which can be selected to reveal additional components that can be added to the model design shown in the workspace 374. The GUI menu includes options for adding elements to the workspace, such as features which may include neural networks, machine learning models, AI models, data sources, conversion processes (e.g., vectorization, encoding, etc.), analytics, etc. The user can continue to add features to the model and connect them using edges or other elements to create a flow within the workspace 374. For example, the user may add a node 376 to a flow of a new model within the workspace 374. For example, the user may connect the node 376 to another node in the diagram via an edge 378, creating a dependency within the diagram. When the user is done, the user can save the model for subsequent training/testing.

In another example, the name of the object can be identified from a web page or a user interface 370 where the object is visible within a browser or the workspace 374 on the user device. A pop-up within the browser or the workspace 374 can be overlayed where the object is visible. The pop-up includes an option to navigate to the identified web page corresponding to the alternative object via a rule set.

Figure 3E:
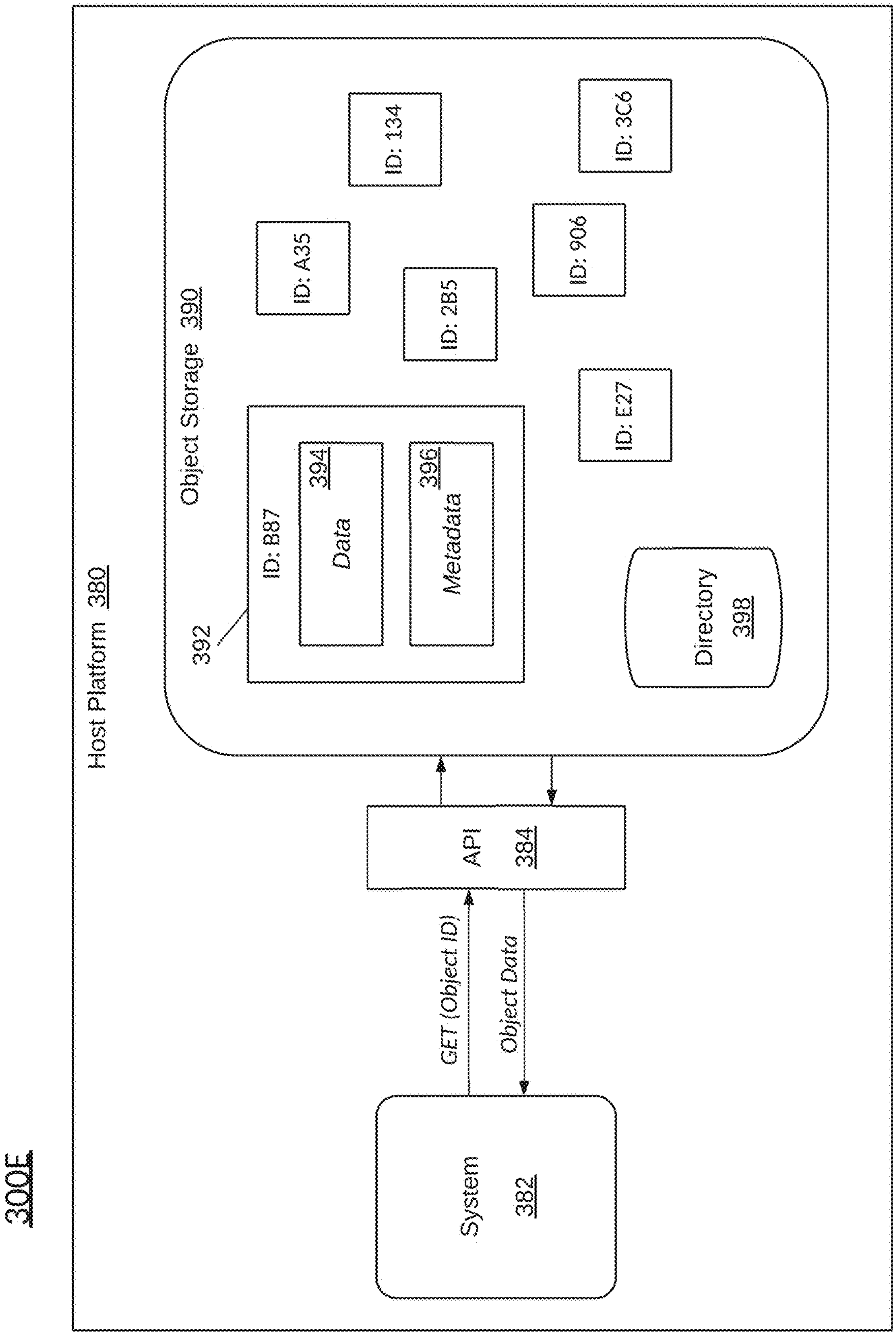
FIG. 3E illustrates a machine learning network diagram, according to an example of the instant solution.

FIG. 3E illustrates a process 300E of accessing an object 392 from an object storage 390 of the host platform 380 according to examples of the instant solution. For example, the object storage 390 may store data that is used by the AI models and machine learning (ML) models, including but not limited to training data, expected outputs for testing, training results, and the like. The object storage 390 may also store any other kind of data. Each object may include a unique identifier, a data section 394, and a metadata section 396, which provide a descriptive context associated with the data, including data that can later be extracted for purposes of machine learning. The unique identifier may uniquely identify an object with respect to all other objects in the object storage 390. The data section 394 may include unstructured data such as web pages, digital content, images, audio, text, and the like.

Instead of breaking files into blocks stored on disks in a file system, the object storage 390 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application can use to locate and access it. In this case, the metadata is more descriptive than a file-based approach. The metadata can be customized with additional context that can later be extracted and leveraged for other purposes, such as data analytics.

The objects that are stored in the object storage 390 may be accessed via an API 384. The API 384 may be a Hypertext Transfer Protocol (HTTP)-based RESTful API (also known as a RESTful Web service). The API 384 can be used by the client application or system 382 to query an object's metadata to locate the desired object data via the Internet from anywhere on any device. The API 384 may use HTTP commands such as "PUT" or "POST" to upload an object, "GET" to retrieve an object, "DELETE" to remove an object, and the like.

The object storage 390 may provide a directory 398 that uses the metadata of the objects to locate appropriate data files. The directory 398 may contain descriptive information about each object stored in the object storage 390, such as a name, a unique identifier, a creation timestamp, a collection name, etc. To query the object within the object storage 390, the client application may submit a command, such as an HTTP command, with an identifier of the object 392, a payload, etc. The object storage 390 can store the actions and results described herein, including associating two or more lists of ranked assets with one another based on variables used by the two or more lists of ranked assets that have a correlation at or above a predetermined threshold.

Figure 4A:
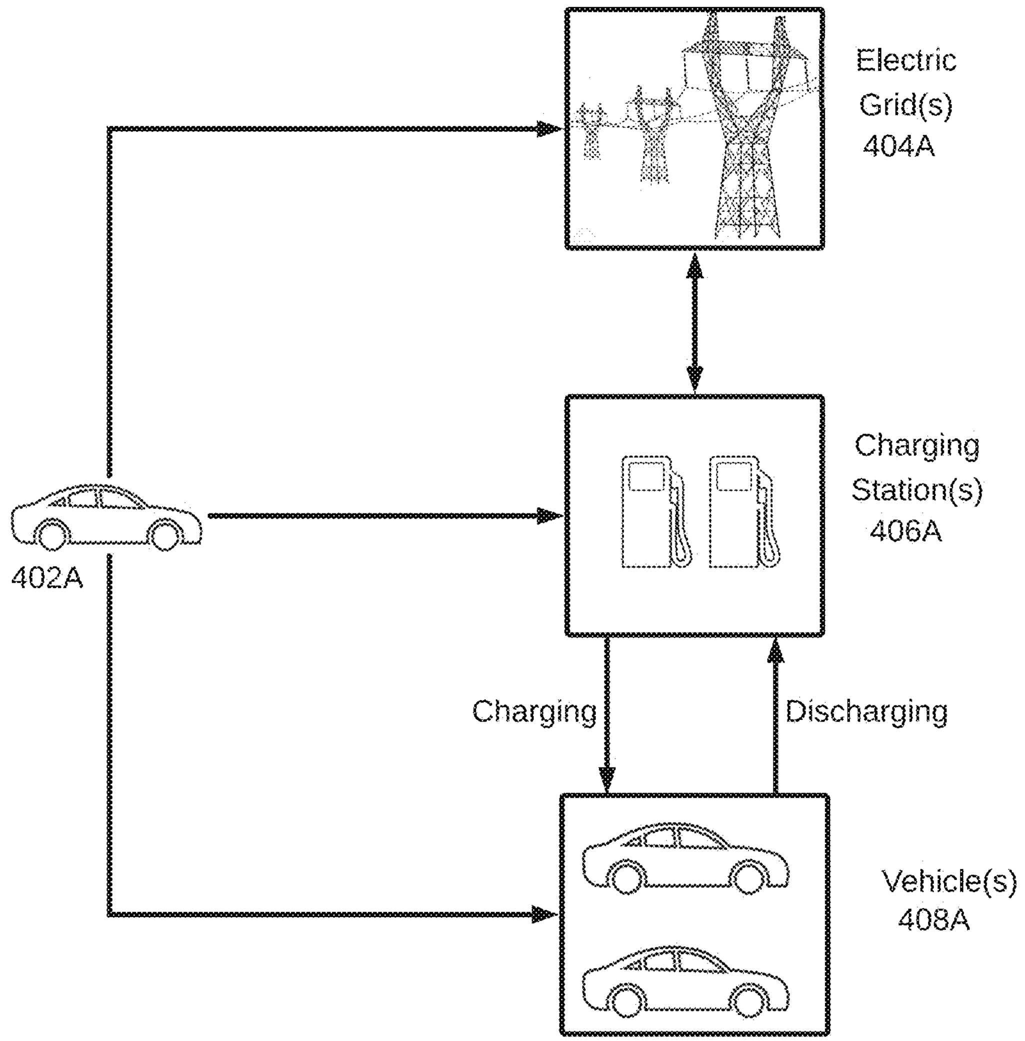
FIG. 4A illustrates a diagram depicting electrification of one or more elements, according to an example of the instant solution.

FIG. 4A illustrates a diagram 400A depicting the electrification of one or more elements. In one example, a vehicle 402A may provide energy stored in its batteries to one or more elements, including other vehicle(s) 408A, charging station(s) 406A, and electric grid(s) 404A. The electric grid(s) 404A is/are coupled to one or more of the charging station(s) 406A, which may be coupled to one or more of the vehicle(s) 408A. This configuration allows the distribution of electricity/power received from the vehicle 402A. The vehicle 402A may also interact with the other vehicle(s) 408A, such as via V2V technology, communication over cellular networks, Wi-Fi®, and the like. The vehicle 402A may also interact via wired and/or wireless connections with other vehicles 408A, the charging station(s) 406A and/or with the electric grid(s) 404A. In one example, the vehicle 402A is routed (or routes itself) in a safe and efficient manner to the electric grid(s) 404A, the charging station(s) 406A, or the other vehicle(s) 408A. Using one or more examples of the instant solution, the vehicle 402A can provide energy to one or more of the elements depicted herein in various advantageous ways as described and/or depicted herein. Further, the safety and efficiency of the vehicle may be increased, and the environment may be positively affected as described and/or depicted herein. The term "charging station" herein may be referred to as a charging point, a charging bay, or a charging device and may refer to a device that is connected to a vehicle, such as through a charging port on the vehicle, where electricity is provided to the vehicle or received from the vehicle (Vehicle-to-Grid or V2G). It may also refer to a location connected to the charging port on the vehicle, such as an outlet or device at a home that provides electricity to charge the vehicle's battery. The connection can be between the vehicle and the charging infrastructure. The connection can be a physical and/or a wireless connection.

The terms 'energy,' 'electricity,' 'power,' and the like may be used to denote any form of energy received, stored, used, shared, and/or lost by the vehicle(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternative power sources, including but not limited to lithium-based, nickel-based, hydrogen fuel cells, atomic/nuclear energy, fusion-based energy sources, and energy generated during an energy sharing and/or usage operation for increasing or decreasing one or more vehicles energy levels at a given time.

In one example, the charging station 406A manages the amount of energy transferred from the vehicle 402A such that there is sufficient charge remaining in the vehicle 402A to arrive at a destination. In another example, a wireless connection is used to wirelessly direct an amount of energy transfer between vehicles 408A, wherein the vehicles may both be in motion. In another example, wireless charging may occur via a fixed charger and batteries of the vehicle in alignment with one another (such as a charging mat in a garage or parking space). In another example, an idle vehicle, such as a vehicle 402A (which may be autonomous) is directed to provide an amount of energy to a charging station 406A and return to the original location (for example, its original location or a different destination). In another example, a mobile energy storage unit (not shown) is used to collect surplus energy from at least one other vehicle 408A and transfer the stored surplus energy at a charging station 406A. In another example, factors determine an amount of energy to transfer to a charging station 406A, such as distance, time, traffic conditions, road conditions, environmental/weather conditions, the vehicle's condition (weight, etc.), an occupant(s) schedule while utilizing the vehicle, a prospective occupant(s) schedule waiting for the vehicle, etc. In another example, the vehicle(s) 408A, the charging station(s) 406A and/or the electric grid(s) 404A can provide energy to the vehicle 402A.

In one example of the instant solution, a location such as a building, a residence, or the like (not depicted), is communicably coupled to one or more of the electric grid(s) 404A, the vehicle 402A, and/or the charging station(s)

406A. The rate of electric flow to one or more of the location, the vehicle 402A and/or the other vehicle(s) 408A is modified, depending on external conditions, such as weather. For example, when the external temperature is extremely hot or extremely cold, raising the chance for an outage of electricity, the flow of electricity to a connected vehicle 402A/408A is slowed to help minimize the chance of an outage.

In one example of the instant solution, vehicles 402A and 408A may be utilized as bidirectional vehicles. Bidirectional vehicles are those that may serve as mobile microgrids that can assist in the supplying of electrical power to the grid 404A and/or reduce the power consumption when the grid is stressed. Bidirectional vehicles incorporate bidirectional charging, which in addition to receiving a charge to the vehicle, the vehicle can transfer energy from the vehicle to the grid 404A, otherwise referred to as "V2G". In bidirectional charging, the electricity flows both ways; to the vehicle and from the vehicle. When a vehicle is charged, alternating current (AC) electricity from the grid 404A is converted to direct current (DC). This may be performed by one or more of the vehicle's own converter(s) or a converter on the charging station 406A. The energy stored in the vehicle's batteries may be sent in an opposite direction back to the grid. The energy is converted from DC to AC through a converter usually located in the charging station 406A, otherwise referred to as a bidirectional charger. Further, the instant solution as described and depicted with respect to FIG. 4A can be utilized in this and other networks and/or systems.

Figure 4B:
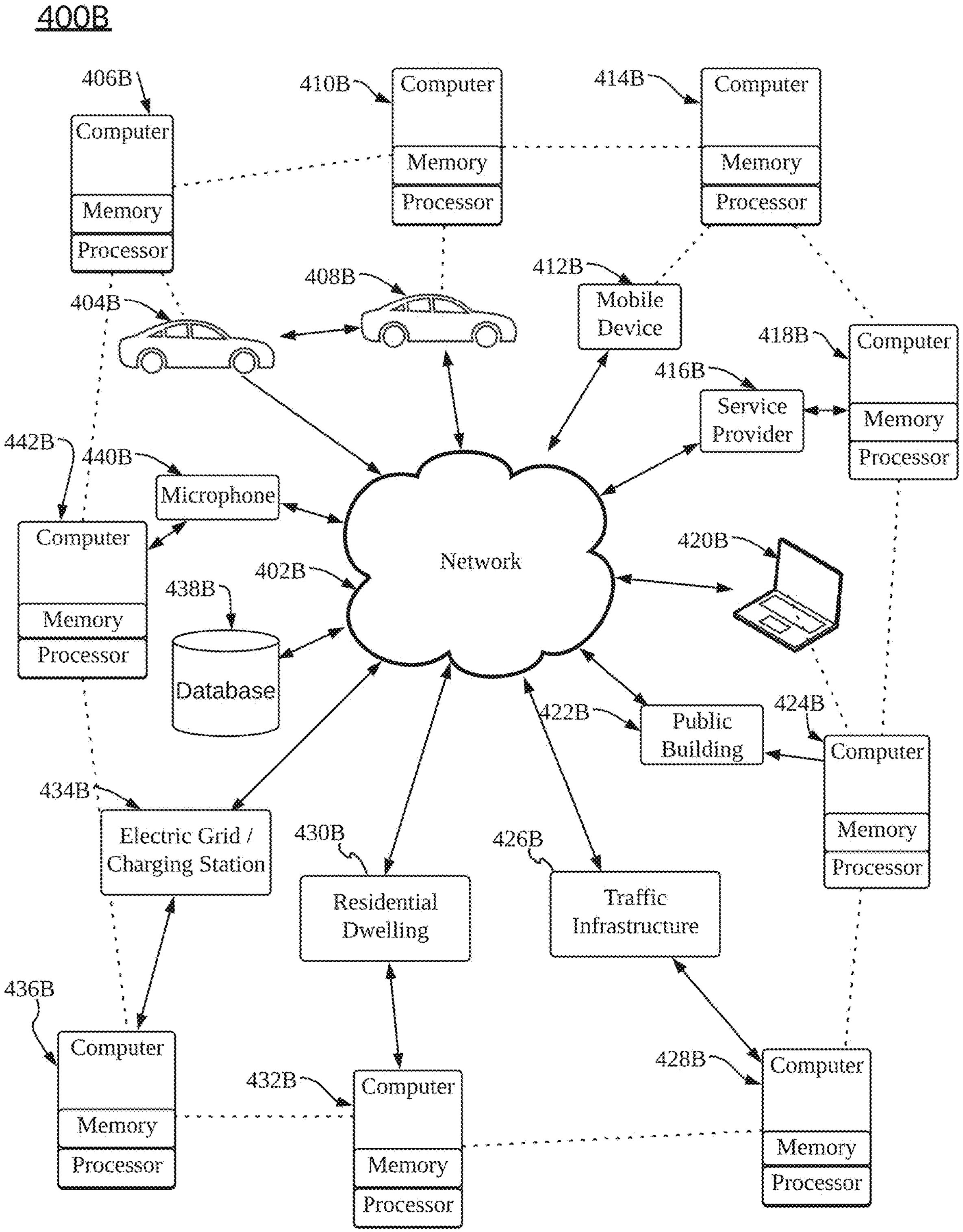
FIG. 4B illustrates a diagram depicting interconnections between different elements, according to an example of the instant solution.

FIG. 4B is a diagram showing interconnections between different elements 400B. The instant solution may be stored and/or executed entirely or partially on and/or by one or more computing devices 414B, 418B, 424B, 428B, 432B, 436B, 406B, 442B and 410B associated with various entities, all communicably coupled and in communication with a network 402B. A database 438B is communicably coupled to the network and allows for the storage and retrieval of data. In one example, the database is an immutable ledger. One or more of the various entities may be a vehicle 404B, service provider 416B, public building 422B, traffic infrastructure 426B, residential dwelling 430B, an electric grid/charging station 434B, a microphone 440B, and/or another vehicle 408B. Other entities and/or devices, such as one or more private users using a mobile device 412B, a laptop 420B, an augmented reality (AR) device, a virtual reality (VR) device, and/or any wearable device may also interwork with the instant solution. The mobile device 412B, laptop 420B, microphone 440B, and other devices may be connected to one or more of the connected computing devices 414B, 418B, 424B, 428B, 432B, 436B, 406B, 442B, and 410B. The one or more public buildings 422B may include various agencies. The one or more public buildings 422B may utilize a computing device 424B. The one or more service provider(s) 416B may include a dealership, a tow truck service, a collision center, or other repair shop. The one or more service provider(s) 416B may utilize a computing apparatus 418B. These various computer devices may be directly and/or communicably coupled to one another, such as via wired networks, wireless networks, blockchain networks, and the like. In one example, the microphone 440B may be utilized as a virtual assistant. In another example, the one or more traffic infrastructure 426B may include one or more traffic signals, one or more sensors including one or more cameras, vehicle speed sensors or traffic sensors, and/or other traffic infrastructure. The one or more traffic infrastructure 426B may utilize a computing device 428B.

In one example of the instant solution, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a vehicle 408B/404B can transport a person, an object, a permanently or temporarily affixed apparatus, and the like. In another example, the vehicle 408B may communicate with vehicle 404B via V2V communication through the computers associated with each vehicle 406B and 410B and may be referred to as a car, vehicle, automobile, and the like. The vehicle 404B/408B may be a self-propelled wheeled conveyance, such as a car, a sports utility vehicle, a truck, a bus, a van, or other motor or battery-driven or fuel cell-driven vehicle. For example, vehicle 404B/408B may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404B/408B may be semi-autonomous or autonomous. For example, vehicle 404B/408B may be self-maneuvering and navigate without human input. An autonomous vehicle may have and use one or more sensors and/or a navigation unit to drive autonomously. All of the data described or depicted herein can be stored, analyzed, processed and/or forwarded by one or more of the elements in FIG. 4B.

Figure 4C:
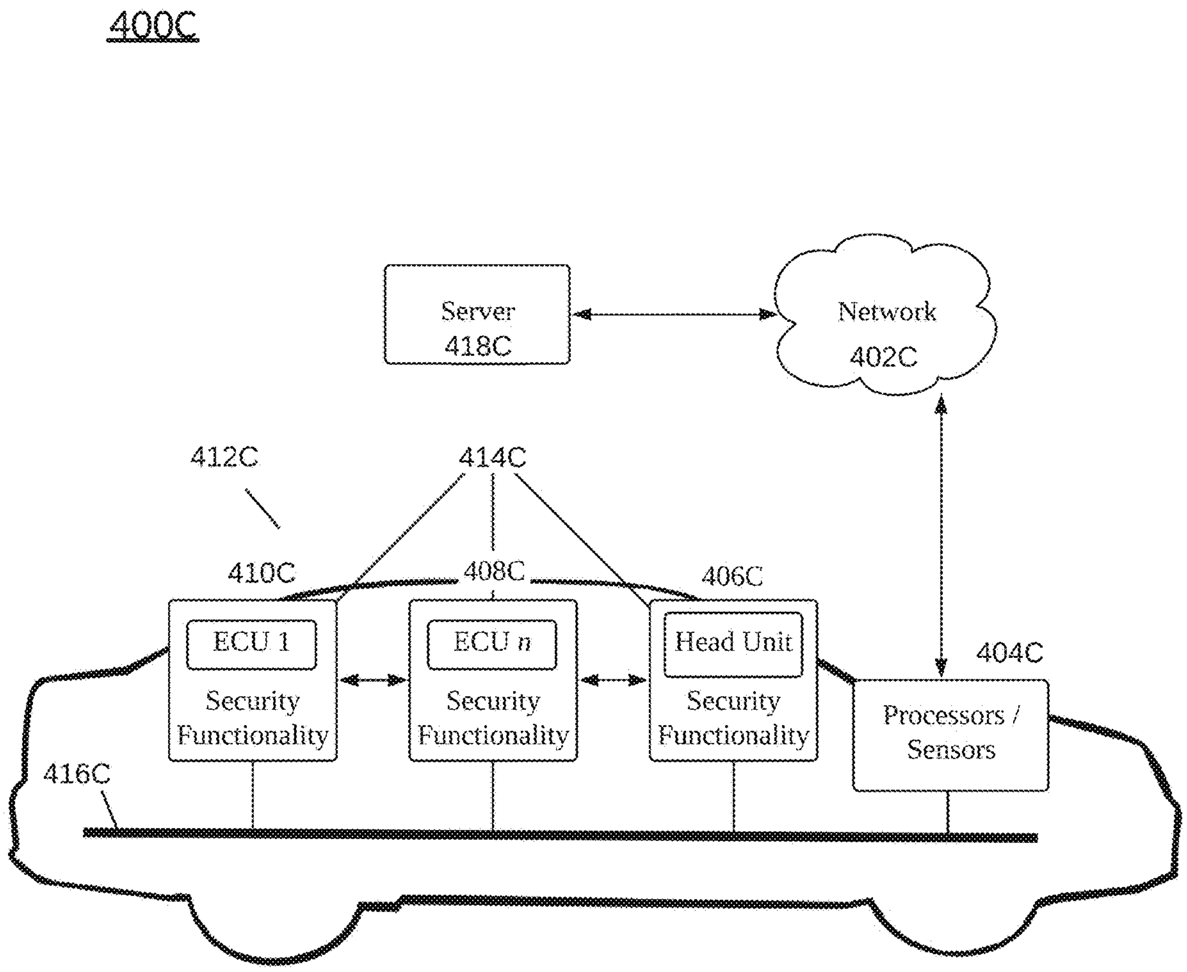
FIG. 4C illustrates a further diagram depicting interconnections between different elements, according to an example of the instant solution.

FIG. 4C is another block diagram showing interconnections between different elements in one example 400C. A vehicle 412C is presented and includes ECUs 410C, 408C, and a head unit (otherwise known as an infotainment system) 406C. An ECU is an embedded system in automotive electronics that controls one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416C. The ECUs may also communicate with a vehicle computer 404C via the CAN bus 416C. The vehicle's processors/sensors (such as the vehicle computer) 404C can communicate with external elements, such as a server 418C via a network 402C (such as the Internet). Each ECU 410C, 408C, and head unit 406C may contain its own security policy. The security policy defines permissible processes that can be executed in the proper context. In one example, the security policy may be partially or entirely provided in the vehicle computer 404C.

ECUs 410C, 408C, and head unit 406C may each include a custom security functionality element 414C defining authorized processes and contexts within which those processes are permitted to run. Context-based authorization to determine validity if a process can be executed allows ECUs to maintain secure operation and prevent unauthorized access from elements such as the vehicle's CAN Bus. When an ECU encounters a process that is unauthorized, that ECU can block the process from operating. Automotive ECUs can use different contexts to determine whether a process is operating within its permitted bounds, such as proximity contexts, nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
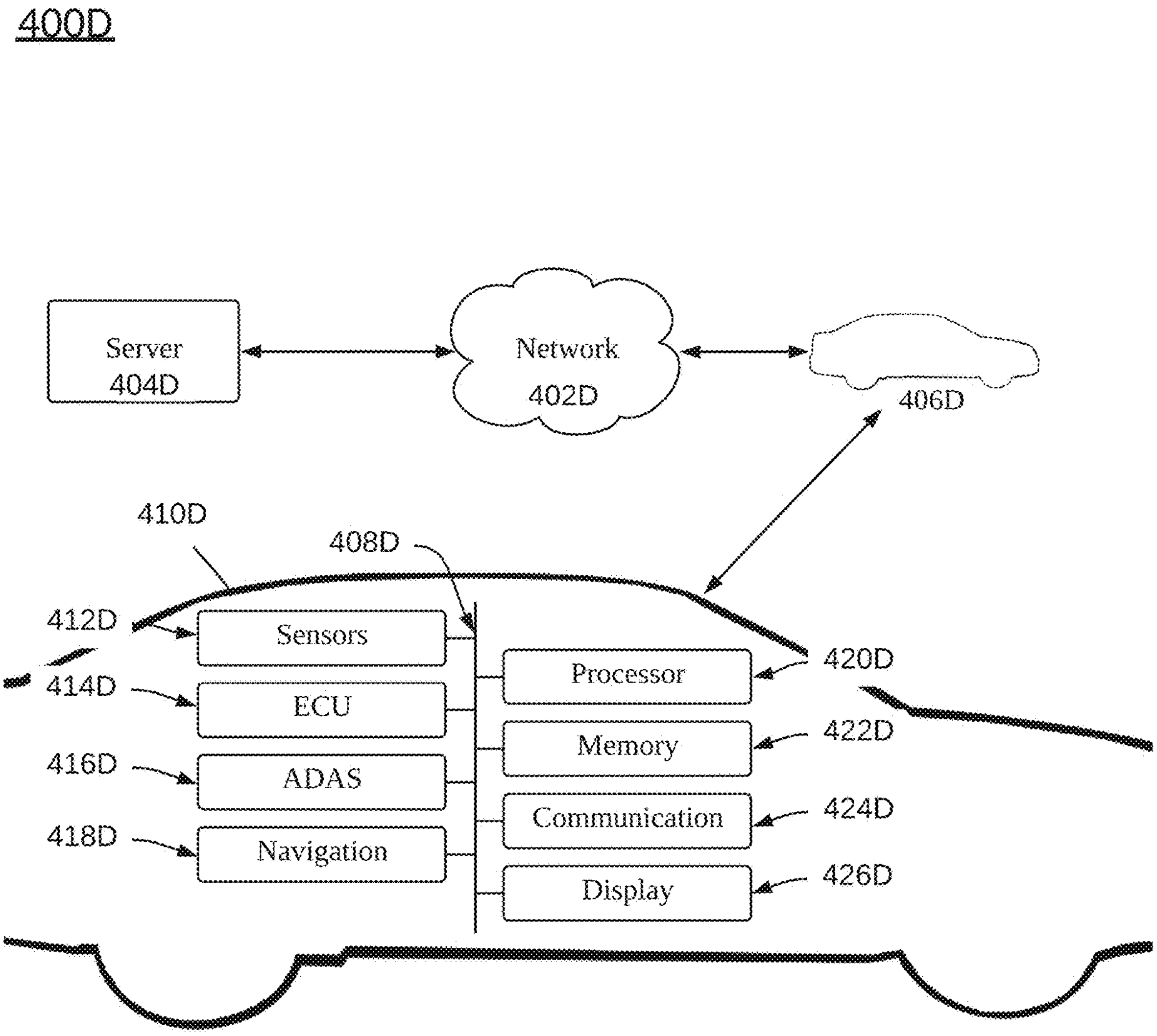
FIG. 4D illustrates yet a further diagram depicting interconnections between elements, according to an example of the instant solution.

Referring to FIG. 4D, an operating environment 400D for a connected vehicle, is illustrated according to some examples of the instant solution. As depicted, the vehicle 410D includes a CAN bus 408D connecting elements 412D-426D of the vehicle. Other elements may be connected to the CAN bus and are not depicted herein. The depicted elements connected to the CAN bus include a sensor set 412D, Electronic Control Units 414D, autonomous features or ADAS 416D, and the navigation system 418D. In some examples of the instant solution, the vehicle 410D includes a processor 420D, a memory 422D, a communication unit 424D, and an electronic display 426D.

The processor 420D includes an arithmetic logic unit, a microprocessor, a general-purpose controller, and/or a similar processor array to perform computations and provide electronic display signals to a display unit 426D. The processor 420D processes data signals and may include various computing architectures, including a complex instruction set computer (CISC) architecture, a reduced instruction set computer (RISC) architecture, or an architecture implementing a combination of instruction sets. The vehicle 410D may include one or more processors 420D. Other processors, operating systems, sensors, displays, and physical configurations that are communicably coupled to one another (not depicted) may be used with the instant solution.

Memory 422D is a non-transitory memory storing instructions or data that may be accessed and executed by the processor 420D. The instructions and/or data may include code to perform the techniques described herein. The memory 422D may be a dynamic random-access memory (DRAM) device, a static random-access memory (SRAM) device, flash memory, or another memory device. In some examples of the instant solution, the memory 422D also may include non-volatile memory or a similar permanent storage device and media, which may include a hard disk drive, a floppy disk drive, a compact disc read only memory (CD-ROM) device, a digital versatile disk read only memory (DVD-ROM) device, a digital versatile disk random access memory (DVD-RAM) device, a digital versatile disk rewritable (DVD-RW) device, a flash memory device, or some other mass storage device for storing information on a permanent basis. A portion of the memory 422D may be reserved for use as a buffer or virtual random-access memory (virtual RAM). The vehicle 410D may include one or more memories 422D without deviating from the current solution.

The memory 422D of the vehicle 410D may store one or more of the following types of data: navigation route data 418D, and autonomous features data 416D. In some examples of the instant solution, the memory 422D stores data that may be necessary for the navigation application 418D to provide the functions.

The navigation system 418D may describe at least one navigation route including a start point and an endpoint. In some examples of the instant solution, the navigation system 418D of the vehicle 410D receives a request from a user for navigation routes wherein the request includes a starting point and an ending point. The navigation system 418D may query a real-time data server 404D (via a network 402D), such as a server that provides driving directions, for navigation route data corresponding to navigation routes, including the start point and the endpoint. The real-time data server 404D transmits the navigation route data to the vehicle 410D via a wireless network 402D, and the communication system 424D stores the navigation data 418D in the memory 422D of the vehicle 410D.

The ECU 414D controls the operation of many of the systems of the vehicle 410D, including the ADAS systems 416D. The ECU 414D may, responsive to instructions received from the navigation system 418D, deactivate any unsafe and/or unselected autonomous features for the duration of a journey controlled by the ADAS systems 416D. In this way, the navigation system 418D may control whether ADAS systems 416D are activated or enabled so that they may be activated for a given navigation route.

The sensor set 412D may include any sensors in the vehicle 410D generating sensor data. For example, the sensor set 412D may include short-range sensors and long-range sensors. In some examples of the instant solution, the sensor set 412D of the vehicle 410D may include one or more of the following vehicle sensors: a camera, a Light Detection and Ranging (LiDAR) sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a global positioning system (GPS) sensor, a mapping functionality, and any other type of automotive sensor. The navigation system 418D may store the sensor data in the memory 422D.

The communication unit 424D transmits and receives data to and from the network 402D or to another communication channel. In some examples of the instant solution, the communication unit 424D may include a dedicated short-range communication (DSRC) transceiver, a DSRC receiver, and other hardware or software necessary to make the vehicle 410D a DSRC-equipped device.

The vehicle 410D may interact with other vehicles 406D via V2V technology. V2V communication includes sensing radar information corresponding to relative distances to external objects, receiving GPS information of the vehicles, setting areas where the other vehicles 406D are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

ECUs are nodes within a vehicle that control tasks ranging from activating the windshield wipers to controlling anti-lock brake systems. ECUs are often connected to one another through the vehicle's central network, which may be referred to as a controller area network (CAN). State-of-the-art features such as autonomous driving are strongly reliant on implementing new, complex ECUs such as ADAS, sensors, and the like. While these new technologies have helped improve the safety and driving experience of a vehicle, they have also increased the number of externally-communicating units inside of the vehicle, making them more vulnerable to attack. Below are some examples of protecting the vehicle from physical intrusion and remote intrusion.

In an example of the instant solution, a CAN includes a CAN bus with a high and low terminal and a plurality of ECUs, which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In one example, the ECU includes a transceiver and a microcontroller. The transceiver may be used to transmit and receive messages to and from the CAN bus. For example, the transceiver may convert the data from the microcontroller into a format of the CAN bus and also convert data from the CAN bus into a format for the microcontroller. Meanwhile, the microcontroller interprets the messages and also decides what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one example of the instant solution, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
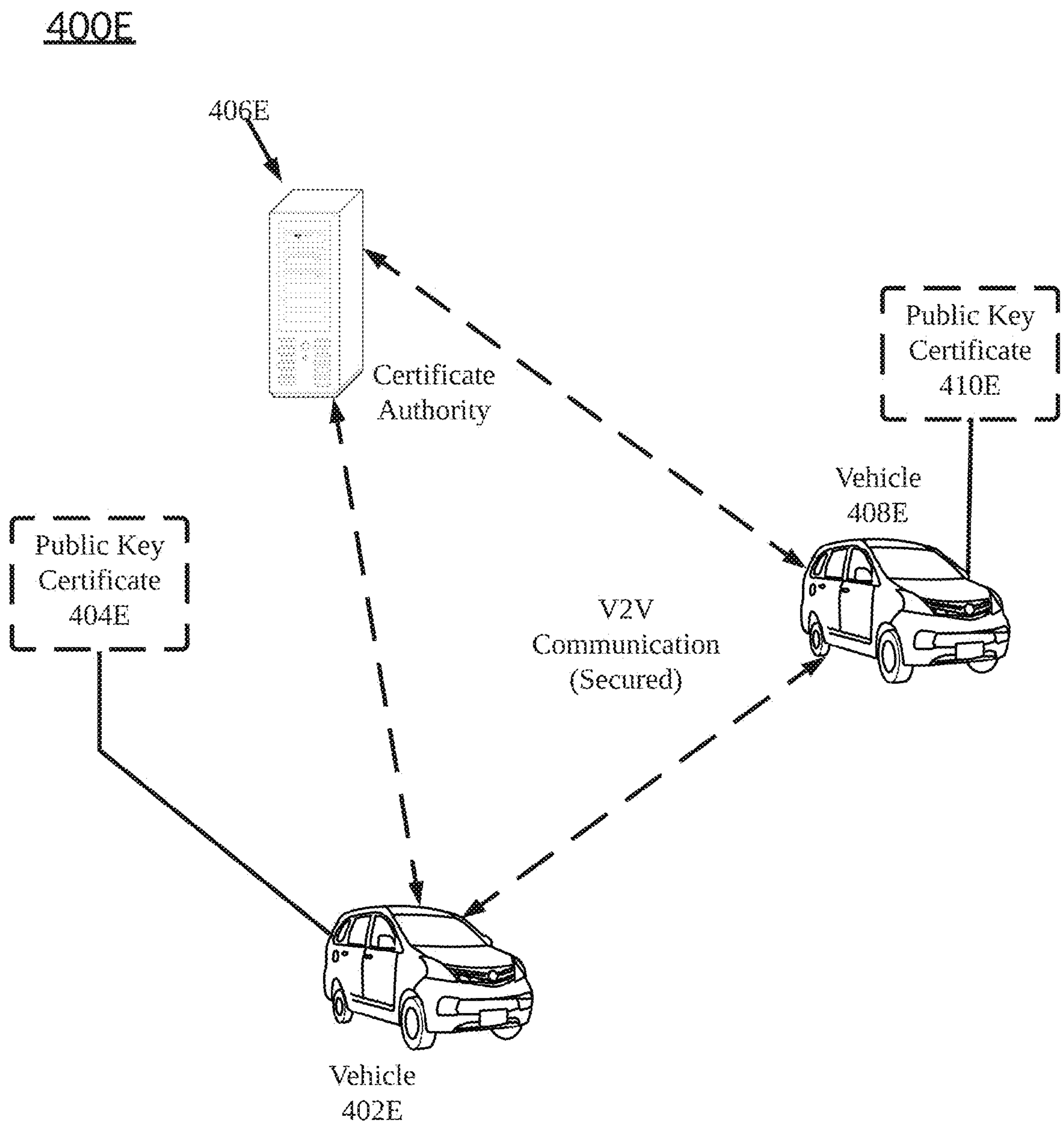
FIG. 4E illustrates yet a further diagram depicting an example of vehicles performing secured Vehicle-to-Vehicle (V2V) communications using security certificates, according to an example of the instant solution.

FIG. 4E illustrates an example 400E of vehicles 402E and 408E performing secured V2V communications using security certificates, according to examples of the instant solution. Referring to FIG. 4E, the vehicles 402E and 408E may communicate via V2V communications over a short-range network, a cellular network, or the like. Before sending messages, the vehicles 402E and 408E may sign the messages using a respective public key certificate. For example, the vehicle 402E may sign a V2V message using a public key certificate 404E. Likewise, the vehicle 408E may sign a V2V message using a public key certificate 410E. The public key certificates 404E and 410E are associated with the vehicles 402E and 408E, respectively, in one example.

Upon receiving the communications from each other, the vehicles may verify the signatures with a certificate authority 406E or the like. For example, the vehicle 408E may verify with the certificate authority 406E that the public key certificate 404E used by vehicle 402E to sign a V2V communication is authentic. If the vehicle 408E successfully verifies the public key certificate 404E, the vehicle knows that the data is from a legitimate source. Likewise, the vehicle 402E may verify with the certificate authority 406E that the public key certificate 410E used by the vehicle 408E to sign a V2V communication is authentic. Further, the instant solution as described and depicted with respect to FIG. 4E can be utilized in this and other networks and/or systems including those that are described and depicted herein.

In some examples of the instant solution, a computer may include a security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some examples of the instant solution, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module may provide information for authenticating communications between the ECUs. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
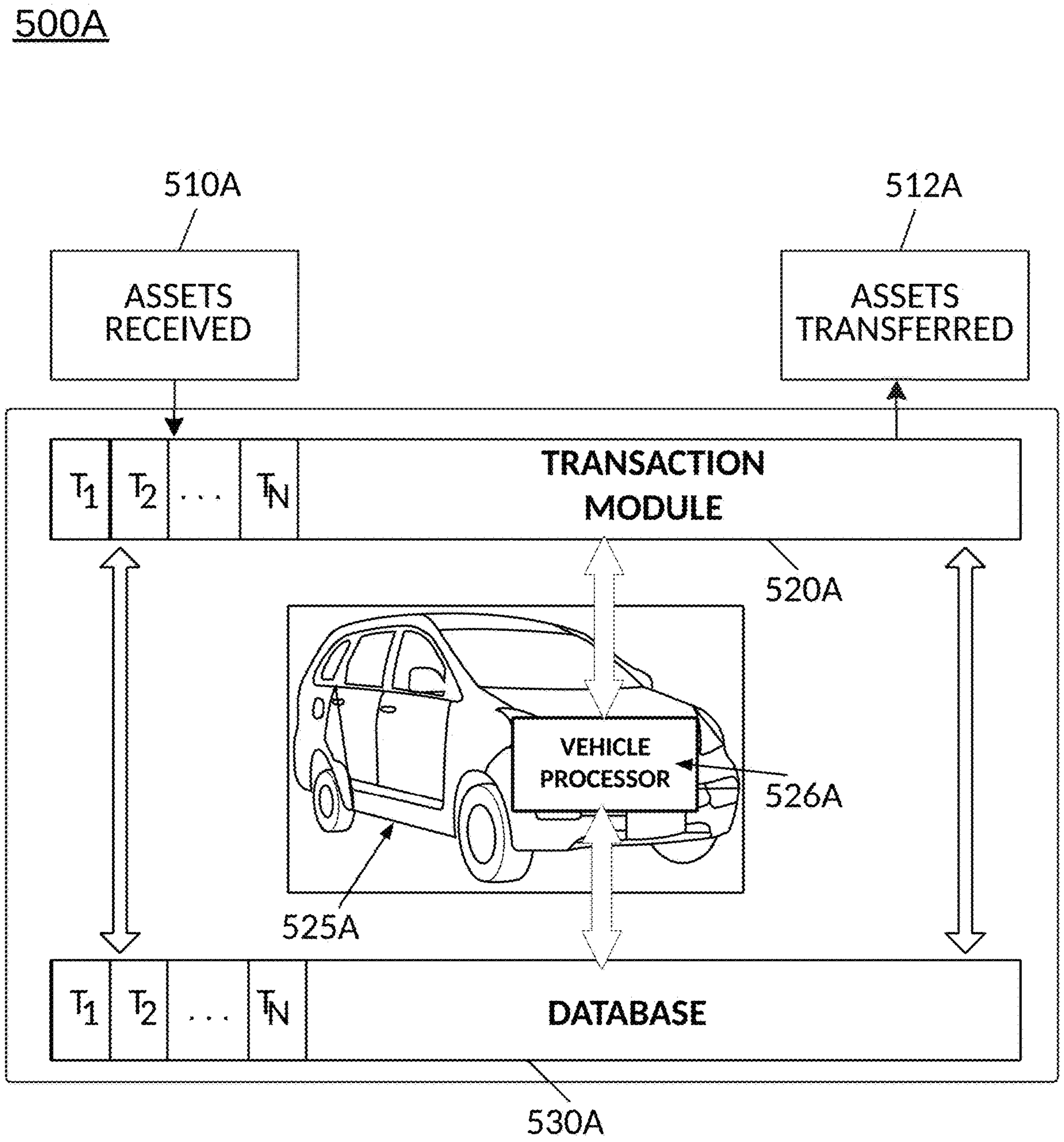
FIG. 5A illustrates an example vehicle configuration for managing database transactions associated with a vehicle, according to an example of the instant solution.

FIG. 5A illustrates an example vehicle configuration 500A for managing database transactions associated with a vehicle, according to examples of the instant solution. Referring to FIG. 5A, as a particular vehicle 525A is engaged in transactions (e.g., vehicle service, dealer transactions, delivery/pickup, transportation services, etc.), the vehicle may receive assets 510A and/or expel/transfer assets 512A according to a transaction(s). A vehicle processor 526A resides in the vehicle 525A and communication exists between the vehicle processor 526A, a database 530A, and the transaction module 520A. The transaction module 520A may record information, such as assets, parties, credits, service descriptions, date, time, location, results, notifications, unexpected events, etc. Those transactions in the transaction module 520A may be replicated into a database 530A. The database 530A can be one of a SQL database, a relational database management system (RDBMS), a relational database, a non-relational database, a blockchain, a distributed ledger, and may be on board the vehicle, may be off-board the vehicle, may be accessed directly and/or through a network, or be accessible to the vehicle.

In one example of the instant solution, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be en route to pick up a package for delivery. A vehicle processor resides in the vehicle and communication exists between the vehicle processor, a first database, and a transaction module. The vehicle may notify another vehicle, which is in its network and which operates on its service, such as its blockchain member service. A vehicle processor resides in another vehicle and communication exists between the vehicle processor, a second database, and a transaction module. The another vehicle may then receive the information via a wireless communication request to perform the package pickup from the vehicle and/or from a server (not shown). The transactions are logged in the transaction modules and of both vehicles. The credits are transferred from the vehicle to the other vehicle and the record of the transferred service is logged in the first database. The first database can be one of a SQL database, an RDBMS, a relational database, a non-relational database, a blockchain, a distributed ledger, and may be on board the vehicle, may be off-board the vehicle, may be accessible directly and/or through a network.

Figure 5B:
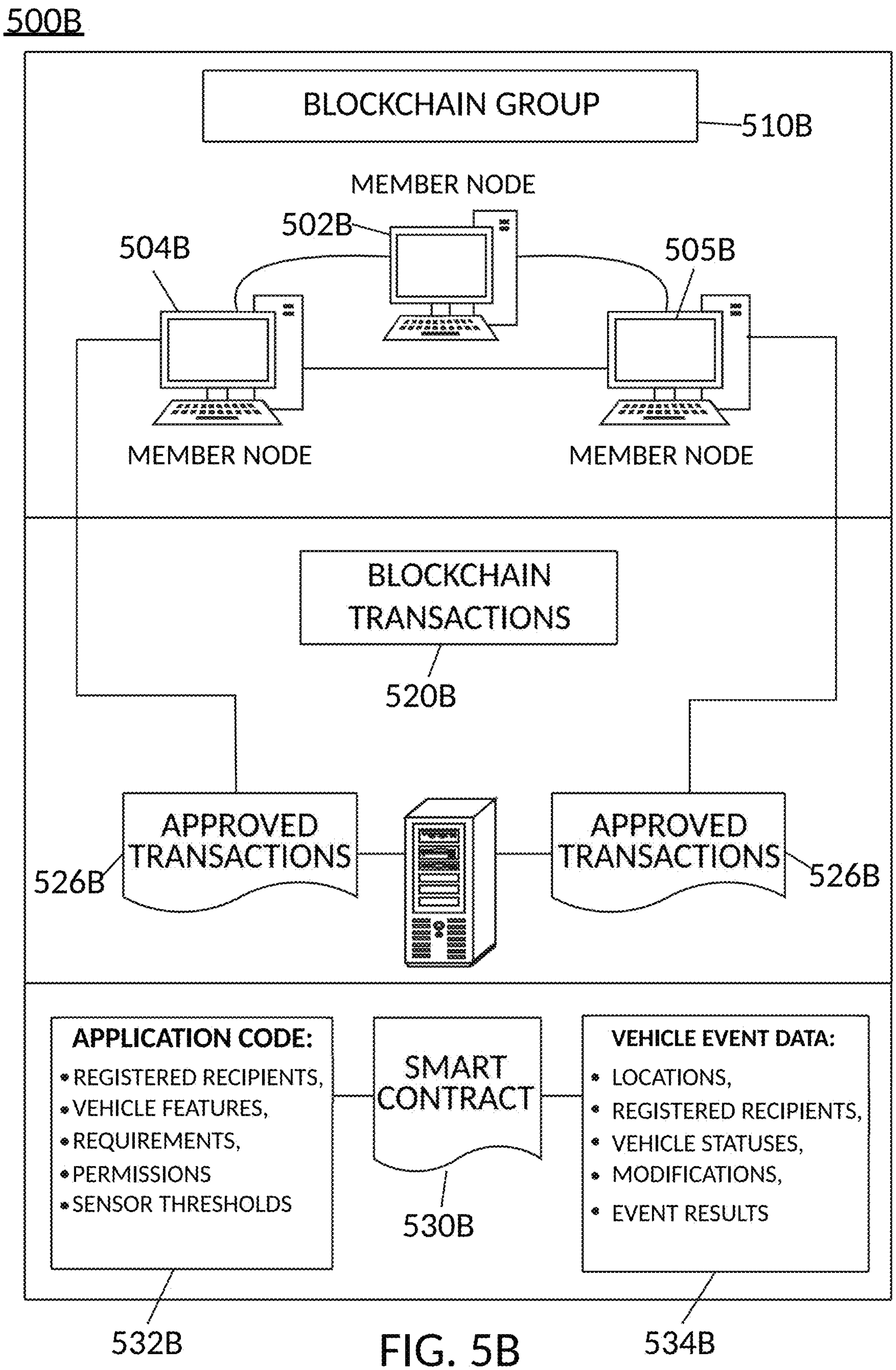
FIG. 5B illustrates an example blockchain group, according to an example of the instant solution.

FIG. 5B illustrates a blockchain architecture configuration 500B, according to examples of the instant solution. Referring to FIG. 5B, the blockchain architecture 500B may include certain blockchain elements, for example, a group of blockchain member nodes 502B-505B as part of a blockchain group 510B. In one example of the instant solution, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520B are stored in memory of computers as the transactions are received and approved by the consensus model dictated by the members' nodes. Approved transactions 526B are stored in current blocks of the blockchain and committed to the blockchain via a committal procedure, which includes performing a hash of the data contents of the transactions in a current block and referencing a previous hash of a previous block. Within the blockchain, one or more smart contracts 530B may exist that define the terms of transaction agreements and actions included in smart contract executable application code 532B, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/at/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534B, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530B, which are then stored in a blockchain. For example, sensor thresholds stored in the smart contract can be used as the basis for whether a detected service is necessary and when and where the service should be performed.

In one example of the instant solution, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
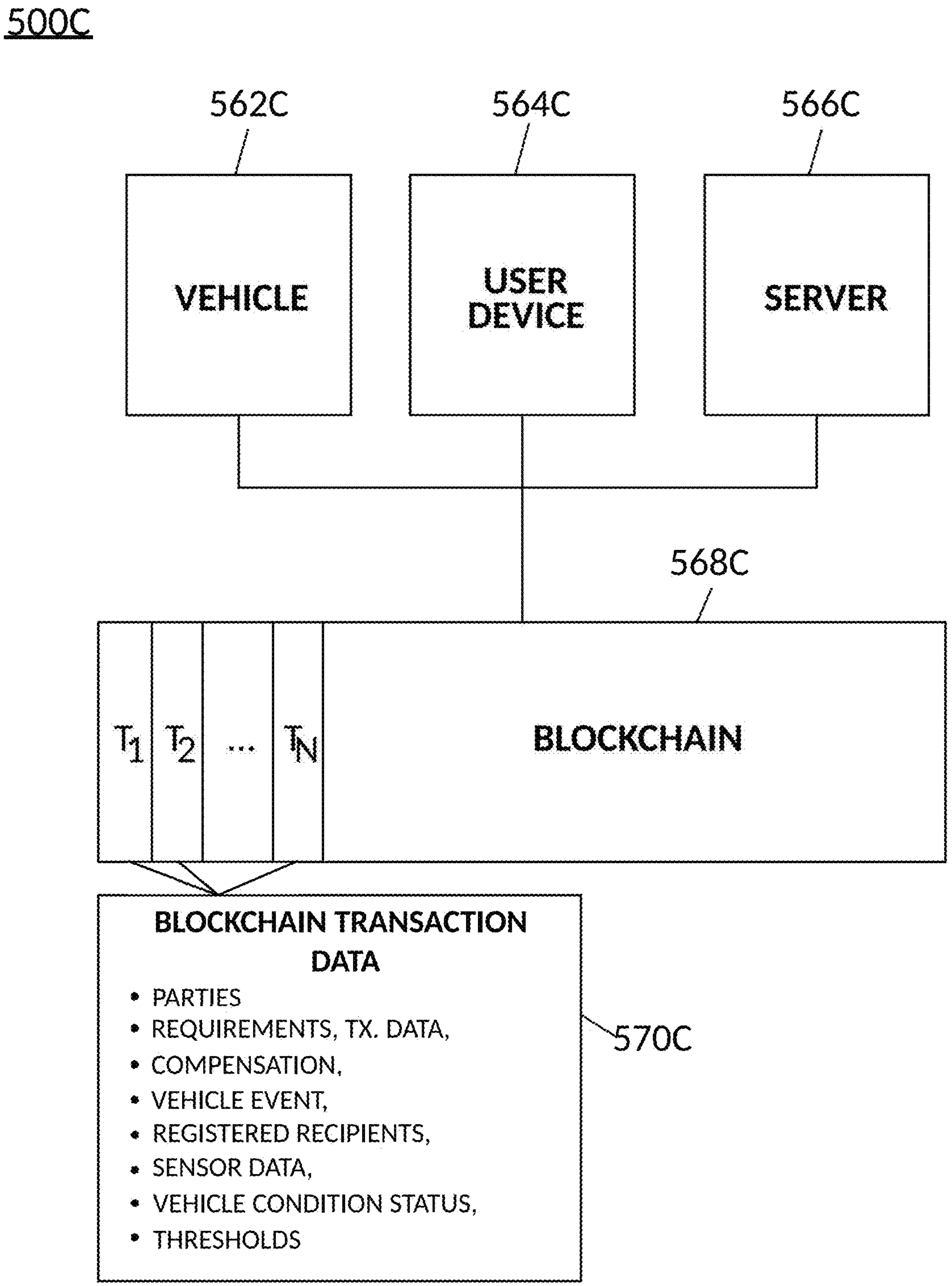
FIG. 5C illustrates an example interaction between elements and a blockchain, according to an example of the instant solution.

FIG. 5C illustrates a blockchain configuration for storing blockchain transaction data, according to examples of the instant solution. Referring to FIG. 5C, the example configuration 500C provides for the vehicle 562C, the user device 564C and a server 566C sharing information with a distributed ledger (i.e., blockchain) 568C. The server may represent a service provider entity inquiring with a vehicle service provider to share user profile rating information in the event that a known and established user profile is attempting to rent a vehicle with an established rated profile. The server 566C may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 570C is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
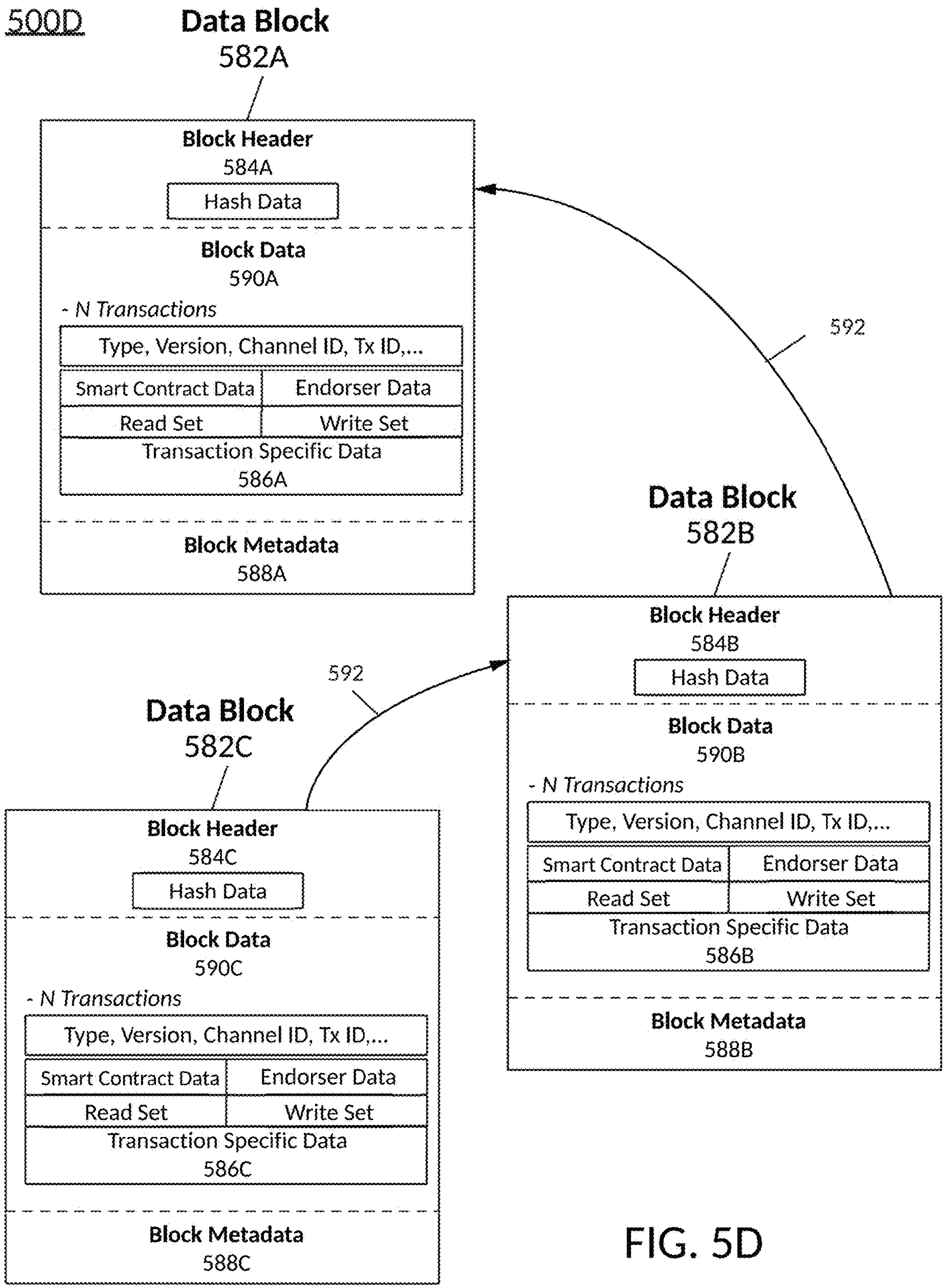
FIG. 5D illustrates an example data block interaction, according to an example of the instant solution.

FIG. 5D illustrates blockchain blocks 500D that can be added to a distributed ledger, according to examples of the instant solution, and contents of block structures 582A to 582*n*. Referring to FIG. 5D, clients (not shown) may submit entries to blockchain nodes to enact activity on the blockchain. As an example, clients may be applications that act on behalf of a requester, such as a device, person, or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing node creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forwarded by the client application to an ordering service.

The ordering service accepts endorsed entries, orders them into a block, and delivers the blocks to the committing peers. For example, the ordering service may initiate a new block when a threshold of entries has been reached, a timer times out, or another condition is met. In this example, a blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specify the order in which those entries are committed to the distributed ledger. The architecture of the blockchain network may be designed such that the specific implementation of 'ordering' becomes a pluggable component.

Entries are written to the distributed ledger in a consistent order. The order of entries is established to ensure that the updates to the state database are valid when they are committed to the network. Unlike a cryptocurrency blockchain system where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584*n*, transaction-specific data 586A to 586*n*, and block metadata 588A to 588*n*. It should be appreciated that the various depicted blocks and their contents, such as block 582A and its contents are merely for purposes of an example and are not meant to limit the scope of the examples of the instant solution. In some cases, both the block header 584A and the block metadata 588A may be smaller than the transaction-specific data 586A, which stores entry data; however, this is not a requirement. The block 582A may store transactional information of N entries (e.g., 100, 500, 1000, 2000, 3000, etc.) within the block data 590A to 590*n*. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, an input (smart contract executable code and functions), a client (creator) identifier such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some examples of the instant solution, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various examples of the instant solution disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data and a validation code identifying whether an entry was valid/invalid.

The other blocks 582B to 582*n* in the blockchain also have headers, files, and values. However, unlike the first block 582A, each of the headers 584A to 584*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

Figure 5E:
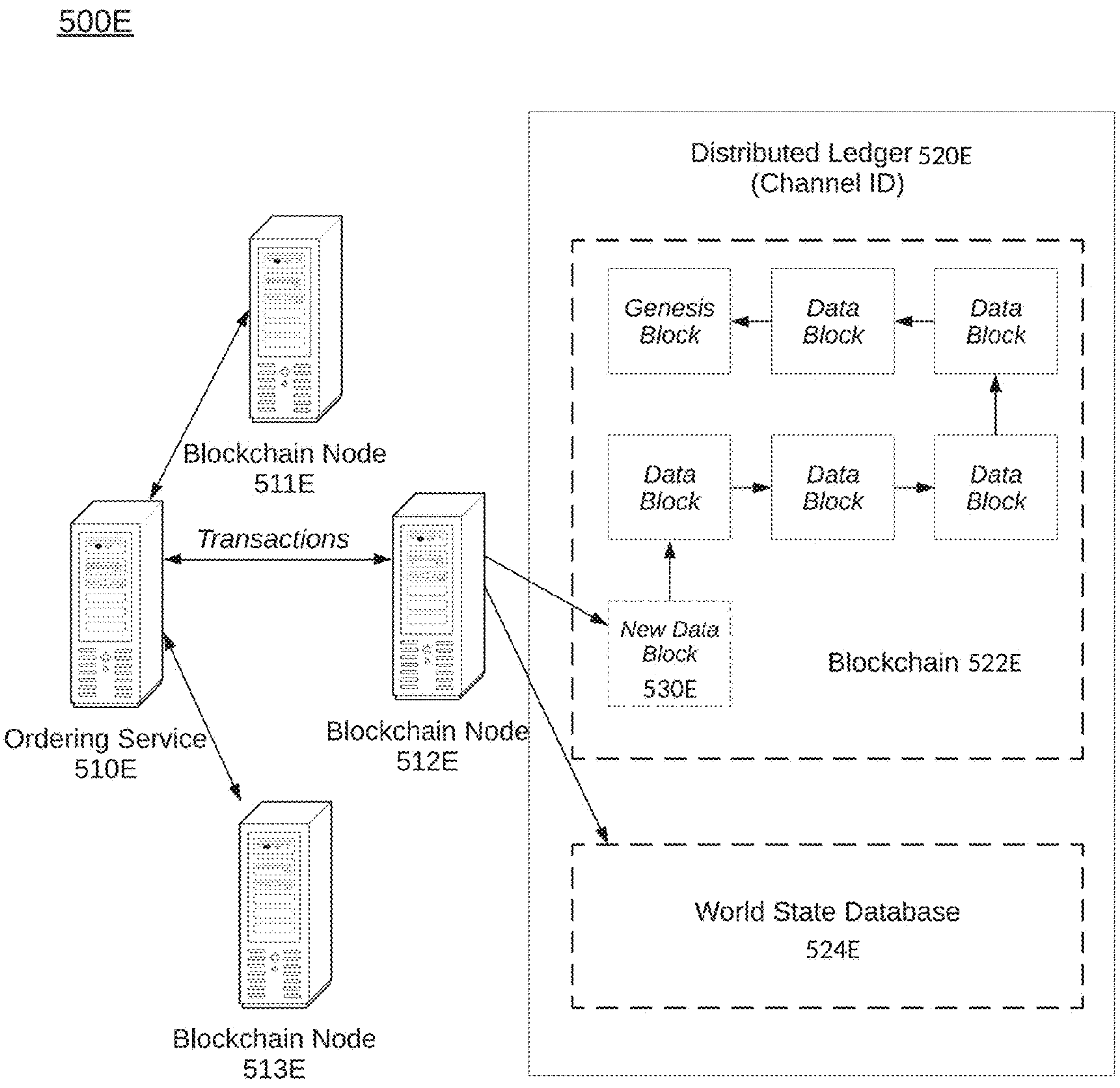
FIG. 5E illustrates a blockchain network diagram, according to an example of the instant solution.

FIG. 5E illustrates a process 500E of a new block being added to a distributed ledger 520E, according to examples of the instant solution, and FIG. 5D illustrates the contents of FIG. 5E's new data block structure 530E for blockchain, according to examples of the instant solution. Referring to FIG. 5E, clients (not shown) may submit transactions to blockchain nodes 511E, 512E, and/or 513E. Clients may be instructions received from any source to enact activity on the blockchain 522E. As an example, clients may be applications that act on behalf of a requester, such as a device, person, or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520E. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 520E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E. The state database 524E may include an indexed view into the transaction log of the blockchain 522E, and it can therefore be regenerated from the chain at any time. The state database 524E may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forwarded by the client application to the ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition is met. In the example of FIG. 5E, the blockchain node 512E is a committing peer that has received a new data block 530E for storage on blockchain 522E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 522E. The architecture of the blockchain network may be designed such that the specific implementation of 'ordering' becomes a pluggable component.

Transactions are written to the distributed ledger 520E in a consistent order. The order of transactions is established to ensure that the updates to the state database 524E are valid when they are committed to the network. Unlike a cryptocurrency blockchain system where ordering occurs through the solving of a cryptographic puzzle, or mining, in this example the parties of the distributed ledger 520E may choose the ordering mechanism that best suits the network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Figure 5F:
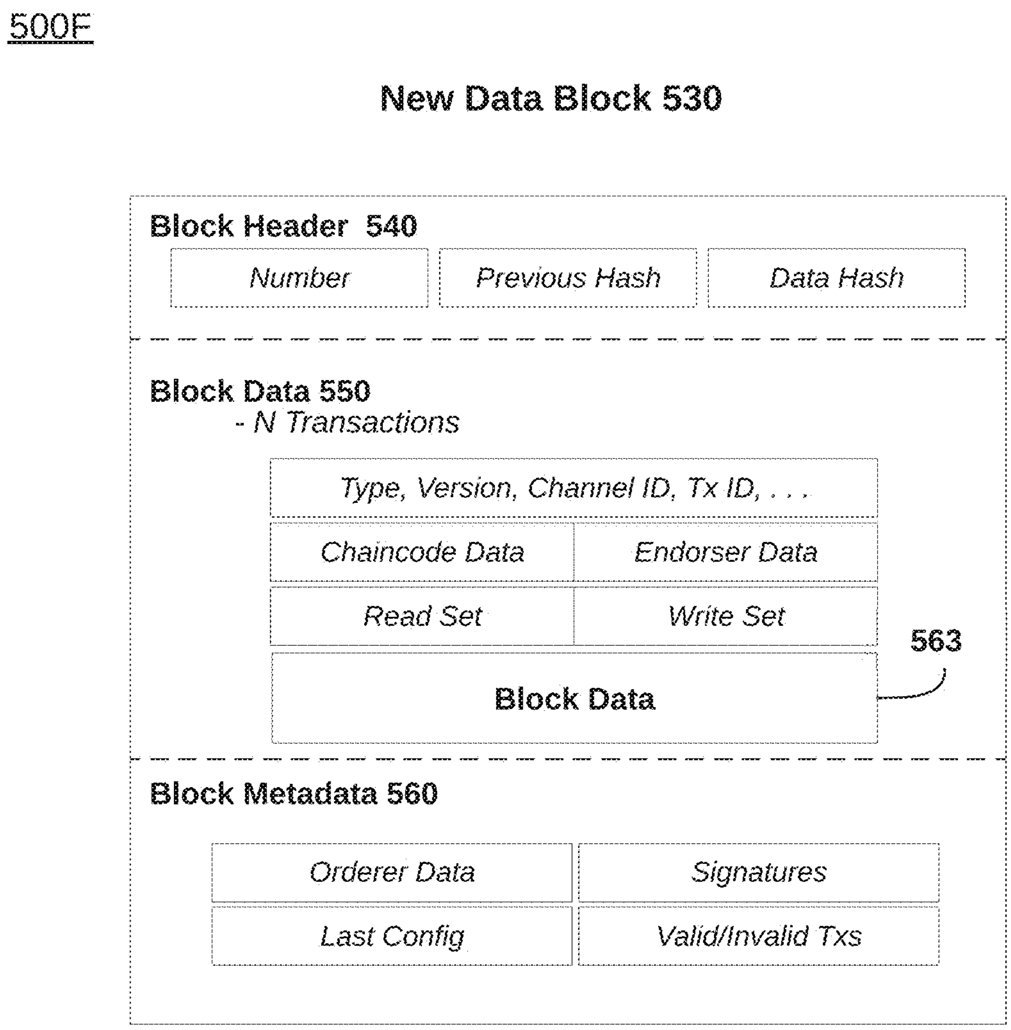
FIG. 5F illustrates an example new data block, according to an example of the instant solution.

Referring to FIG. 5F 500F, a new data block 530 (also referred to as a data block) that is stored on the blockchain 522E of the distributed ledger 520E may include multiple data segments such as a block header 540, block data 550, and block metadata 560. It should be appreciated that the various depicted blocks and their contents, such as new data block 530 and its contents shown in FIG. 5F, are merely examples and are not meant to limit the scope of the examples of the instant solution. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E (shown in FIG. 5E), a transaction ID, an epoch, a payload visibility, a chaincode path (deploy tx), a chaincode name, a chaincode version, an input (chaincode and functions), a client (creator) identifier such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In one example of the instant solution, the block data 563 may include data comprising one or more of points of interest, charging locations, attributes of the charging locations, an optimal charging location, and the like. Although in FIG. 5F the blockchain data 563 is depicted in the block data 550 but may also be located in the block header 540 or the block metadata 560.

The block metadata 560 may store multiple fields of metadata (e.g., as a byte array, etc.). Metadata fields may include signature on block creation, a reference to a last configuration block, a transaction filter identifying valid and invalid transactions within the block, last offset of an ordering service that ordered the block, and the like. The signature, the last configuration block, and the orderer metadata may be added by the ordering service 510E in FIG. 5E. Meanwhile, a committer of the block (such as blockchain node 512E in FIG. 5E) may add validity/invalidity information based on an endorsement policy, verification of read/write sets, and the like. The transaction filter may include a byte array of a size equal to the number of transactions in the block data and a validation code identifying whether a transaction was valid/invalid.

The above examples of the instant solution may be implemented in hardware, in a computer program executed by a processor, in firmware, or in a combination of the above. A computer program may be embodied on a computer-readable storage medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computing system architecture 600, which may represent or be integrated in any of the above-described components, etc.

Figure 6:
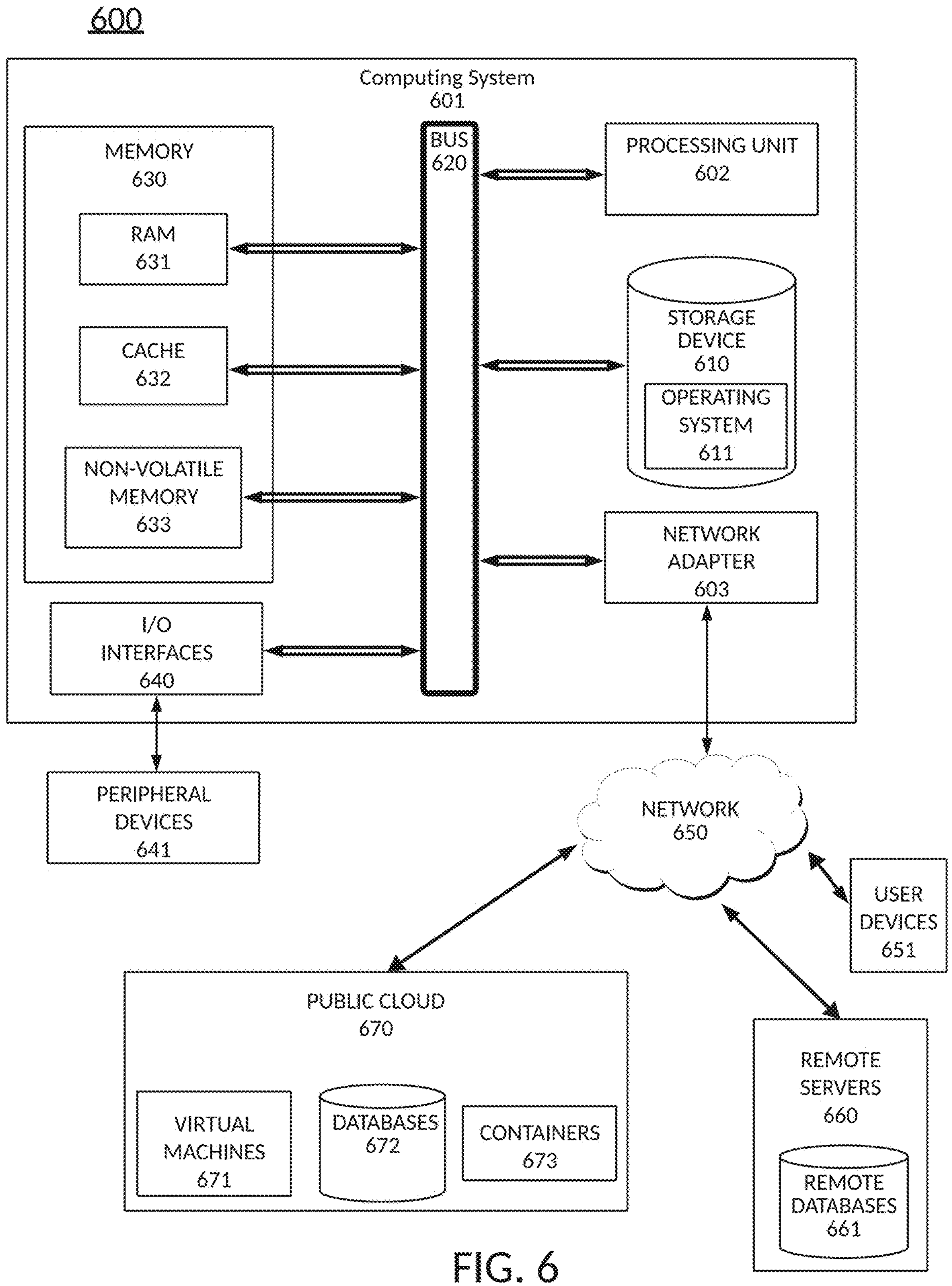
FIG. 6 illustrates an example system that supports one or more of an example of the instant solution.

FIG. 6 illustrates a computing environment according to examples of the instant solution. FIG. 6 is not intended to suggest any limitation as to the scope of use or functionality of examples of the instant solution of the application described herein. Regardless, the computing environment 600 can be implemented to perform any of the functionalities described herein. In computer environment 600, computing system 601 is operational within numerous other general-purpose or special-purpose computing system environments or configurations.

Computing system 601 may take the form of a desktop computer, laptop computer, tablet computer, smartphone, smartwatch or other wearable computer, server computing system, thin client, thick client, network PC, minicomputing system, mainframe computer, quantum computer, and distributed cloud computing environment that includes any of the described systems or devices, and the like or any other form of computer or mobile device now known or to be developed in the future that is capable of running a program, accessing a network 650 or querying a database. Depending upon the technology, the performance of a computer-implemented method may be distributed among multiple computers and between multiple locations. However, in this presentation of the computing environment 600, a detailed discussion is focused on a single computer, specifically computing system 601, to keep the presentation as simple as possible.

Computing system 601 may be located in a cloud, even though it is not shown in a cloud in FIG. 6. On the other hand, computing system 601 is not required to be in a cloud except to any extent as may be affirmatively indicated. Computing system 601 may be described in the general context of computing system-executable instructions, such as program modules, executed by a computing system 601. Generally, program modules may include routines, programs, objects, components, logic, data structures, and so on that perform tasks or implement certain abstract data types. As shown in FIG. 6, computing system 601 in computing environment 600 is shown in the form of a general-purpose computing device. The components of computing system 601 may include, but are not limited to, one or more processors or processing units 602, a system memory 630, and a bus 620 that couples various system components, including system memory 630 to processing unit 602.

Processing unit 602 includes one or more computer processors of any type now known or to be developed. The processing unit 602 may contain circuitry distributed over multiple integrated circuit chips. The processing unit 602 may also implement multiple processor threads and multiple processor cores. Cache 632 is a memory that may be in the processor chip package(s) or located "off-chip," as depicted in FIG. 6. Cache 632 is typically used for data or code that the threads or cores running on the processing unit 602 should be available for rapid access. In some computing environments, processing unit 602 may be designed to work with qubits and perform quantum computing.

Network adapter 603 enables the computing system 601 to connect and communicate with one or more networks 650, such as a local area network (LAN), a wide area network (WAN), and/or a public network (e.g., the Internet). It bridges the computer's internal bus 620 and the external network, exchanging data efficiently and reliably. The network adapter 603 may include hardware, such as modems or Wi-Fi® signal transceivers, and software for packetizing and/or de-packetizing data for communication network transmission. Network adapter 603 supports various communication protocols to ensure compatibility with network standards. For Ethernet connections, it adheres to protocols such as IEEE 802.3, while for wireless communications, it might support IEEE 802.11 standards, Bluetooth®, near-field communication (NFC), or other network wireless radio standards.

Computing system 601 may include a removable/non-removable, volatile/non-volatile computer storage device 610. By way of example only, storage device 610 can be a non-removable, non-volatile magnetic media (not shown and typically called a "hard drive"). One or more data interfaces can connect it to the bus 620. In examples of the instant solution where computing system 601 is required to have a large amount of storage (for example, where computing system 601 locally stores and manages a large database), then this storage may be provided by storage devices 610 designed for storing very large amounts of data, such as a storage area network (SAN) that is shared by multiple, geographically distributed computers.

The operating system 611 is software that manages computing system 601 hardware resources and provides common services for computer programs. Operating system 611 may take several forms, such as various known proprietary operating systems or open-source Portable Operating System Interface type operating systems that employ a kernel.

The bus 620 represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 620 is the signal conduction path that allows the various components of computing system 601 to communicate with each other.

Memory 630 is any volatile memory now known or to be developed in the future. Examples include dynamic random-access memory (RAM 631) or static type RAM 631. Typically, the volatile memory is characterized by random access, but this is not required unless affirmatively indicated. In computing system 601, memory 630 is in a single package and is internal to computing system 601, but alternatively or additionally, the volatile memory may be distributed over multiple packages and/or located externally with respect to computing system 601. By way of example only, memory 630 can be provided for reading from and writing to a non-removable, non-volatile magnetic media (shown as storage device 610, and typically called a "hard drive"). Memory 630 may include at least one program product having a set (e.g., at least one) of program modules configured to carry out various functions. A typical computing system 601 may include cache 632, a specialized volatile memory generally faster than RAM 631 and generally located closer to the processing unit 602. Cache 632 stores frequently accessed data and instructions accessed by the processing unit 602 to speed up processing time. The computing system 601 may include non-volatile memory 633 in ROM, PROM, EEPROM, and flash memory. Non-volatile memory 633 often contains programming instructions for starting the computer, including the basic input/output system (BIOS) and information required to start the operating system 611.

Computing system 601 may also communicate with one or more peripheral devices 641 via an input/output (I/O) interface 640. Such devices may include a keyboard, a pointing device, a display, etc.; one or more devices that enable a user to interact with computing system 601; and/or any devices (e.g., network card, modem, etc.) that enable computing system 601 to communicate with one or more other computing devices. Such communication can occur via I/O interfaces 640. As depicted, I/O interface 640 communicates with the other components of computing system 601 via bus 620.

Network 650 is any computer network that can receive and/or transmit data. Network 650 can include a WAN, LAN, private cloud, or public Internet, capable of communicating computer data over non-local distances by any technology that is now known or to be developed in the future. Any connection depicted can be wired and/or wireless and may traverse other components that are not shown. In some examples of the instant solution, a network 650 may be replaced and/or supplemented by LANs designed to communicate data between devices located in a local area, such as a Wi-Fi® network. The network 650 typically includes computer hardware such as copper transmission cables, optical transmission fibers, wireless transmission, routers, firewalls, switches, gateway computers, edge servers, and network infrastructure known now or to be developed in the future. Computing system 601 connects to network 650 via network adapter 603 and bus 620.

User devices 651 are any computing systems used and controlled by an end user in connection with computing system 601. For example, in a hypothetical case where computing system 601 is designed to provide a recommendation to an end user, this recommendation may typically be communicated from network adapter 603 of computing system 601 through network 650 to a user device 651, allowing user device 651 to display, or otherwise present, the recommendation to an end user. User devices can be a wide array of devices, including personal computers (PCs), laptops, tablets, hand-held, mobile phones, etc.

Remote servers 660 are any computers that serve at least some data and/or functionality over a network 650, for example, WAN, a virtual private network (VPN), a private cloud, or via the Internet to computing system 601. These networks 650 may communicate with a LAN to reach users. The user interface may include a web browser or an application that facilitates communication between the user and remote data. Such applications have been called "thin" desktops or "thin clients." Thin clients typically incorporate software programs to emulate desktop sessions. Mobile applications can also be used. Remote servers 660 can also host remote databases 661, with the database located on one remote server 660 or distributed across multiple remote servers 660. Remote databases 661 are accessible from database client applications installed locally on the remote server 660, other remote servers 660, user devices 651, or computing system 601 across a network 650.

A public cloud 670 is an on-demand availability of computing system resources, including data storage and computing power, without direct active management by the user. Public clouds 670 are often distributed, with data centers in multiple locations for availability and performance. Computing resources on public clouds 670 are shared across multiple tenants through virtual computing environments comprising virtual machines 671, databases 672, containers 673, and other resources. A container 673 is an isolated, lightweight software for running an application on the host operating system 611. Containers 673 are built on top of the host operating system's kernel and contain only applications and some lightweight operating system APIs and services. In contrast, virtual machine 671 is a software layer that includes a complete operating system 611 and kernel. Virtual machines 671 are built on top of a hypervisor emulation layer designed to abstract a host computer's hardware from the operating software environment. Public clouds 670 generally offer hosted databases 672 abstracting high-level database management activities. It should be further understood that one or more of the elements described or depicted in FIG. 6 can perform one or more of the actions, functionalities, or features described or depicted herein. Computing environment 600, which may be located in or associated with a vehicle, enhances the functionality and interoperability of components, including computing systems within vehicles. The architecture incorporates a processor and a storage medium, which can be integrated with the processor or configured as separate components. This flexible setup allows for customization based on specific vehicular computing needs, whether embedded within an application-specific integrated circuit (ASIC) for dedicated tasks or as discrete units for modular scalability. The computing system, depicted in FIG. 6, demonstrates adaptability to various vehicular settings, from passenger cars and commercial trucks to autonomous and connected vehicles, supporting a range of functionalities.

Computing system 601 includes a processing unit 602 connected to a system memory 630 via a bus 620. This configuration facilitates the rapid processing and communication necessary for real-time vehicular operations, such as navigation, telematics, and autonomous driving functionalities. A network adapter 603 ensures the system's connectivity to at least vehicular networks and the Internet of Vehicles (IoV), as well as supporting protocols and standards essential for vehicular communication, safety, and entertainment systems.

Storage solutions within the computing system 601 support the robust data requirements of vehicles, from storing extensive maps and software updates to logging vehicle diagnostics and telematics information. The system's operating system 611 is designed to manage these resources efficiently.

The bus architecture 620 is tailored to vehicular needs, supporting high-speed data transfer and reliable communication between the computing system's components, essential for the timely execution of vehicular functions. Memory 630, including both volatile and non-volatile options, is optimized for the operational demands of vehicles, providing the necessary speed and capacity for tasks ranging from immediate processing needs to long-term data storage.

Peripheral interfaces 641 and I/O interfaces 640 are integrated to facilitate interaction with other vehicular systems and components, such as sensors, actuators, and user interfaces, highlighting the system's capacity for vehicular integration. Moreover, the system's design accounts for connectivity with external networks 650, including at least dedicated vehicular communication networks.

One or more of the components described or depicted herein, including at least vehicle 202, computer 224, vehicle node 310, AI/ML systems 330/340/360/332, computers/servers 410C/414C/418C/424C/428C/432C/436C/442C/406C, server 418D, server 404E, Certificate Authority 306I, Member Nodes 502B-505B, server 566C, and servers 510E-513E, may be one or more of the components including at least 601, 641, 650, 651, 660, 670, and 671.

Although an example of at least one of a system, method, and non-transitory computer-readable storage medium has been illustrated in the accompanied drawings and described in the foregoing detailed description, it will be understood that the application is not limited to the examples of the instant solution disclosed, but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device, and/or via a plurality of protocols. Also, the messages sent or received by any of the modules may be sent or received directly and/or via one or more of the other modules.

One skilled in the art will appreciate that a "system" may be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many examples of the instant solution. Indeed, methods, systems and apparatuses disclosed herein may be implemented in localized and distributed forms consistent with computing technology.

It should be noted that some of the system features described in this specification have been presented as modules to emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable storage medium, which may be, for instance, a hard disk drive, flash device, random access memory (RAM), tape, or any other such medium used to store data.

Indeed, a module of executable code may be a single instruction or many instructions and may even be distributed over several different code segments, among different programs, and across several memory devices. Similarly, operational data may be identified and illustrated within modules and embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the examples of the instant solution is not intended to limit the scope of the application as claimed but is merely representative of selected examples of the instant solution of the application.

One having ordinary skill in the art will readily understand that the above may be practiced with steps in a different order and/or with hardware elements in configurations that are different from those which are disclosed. Therefore, although the application has been described based upon these preferred examples of the instant solution, it would be apparent to those of skill in the art that certain modifications, variations, and alternative constructions would be apparent.

While preferred examples of the instant solution of the present application have been described, it is to be understood that the examples of the instant solution described are illustrative only and the scope of the application is to be defined solely by the appended claims when considered with a full range of equivalents and modifications (e.g., protocols, hardware devices, software platforms etc.) thereto.

What is claimed is:

1. A method performed by a vehicle, the method comprising:

determining a point of interest (POI) based on a preference of an occupant of the vehicle;

identifying a plurality of charging stations based on a current location of the vehicle and the POI;

identifying a charging station from the plurality of charging stations based on distances from the current location to the plurality of charging stations and an attribute of the POI;

autonomously controlling the vehicle to travel to the charging station;

determining that the occupant has left the vehicle during a charging operation by the charging station;

upon identifying a change in a status of the charging station, automatically sending a message to a mobile device to cause the mobile device to display the change in status;

upon detecting that the mobile device is moving away from the vehicle after the change in status has been displayed, automatically prompting the mobile device to request that the occupant perform an action.

2. The method of claim 1, wherein the attribute comprises:

a person associated with the occupant currently being located at the POI.

3. The method of claim 1, wherein the attribute comprises;

one or more of an activity at the POI or a weather condition at the POI.

4. The method of claim 1, comprising:

detecting that a battery of the vehicle is currently receiving a charge from the charging station, and wherein the determining that the occupant has left the vehicle is based on global positioning system (GPS) coordinates from the mobile device.

5. The method of claim 1, wherein the identifying of the charging station comprises:

identifying the charging station based on execution of an artificial intelligence (AI) model on the current location, the plurality of charging stations, historical travel routes of the vehicle, and the attribute of the POI.

6. The method of claim 1, comprising:

determining a route from a current location of the vehicle to the charging station, wherein the autonomous control is performed by an advanced driver-assistance system (ADAS) of the vehicle.

7. A vehicle comprising:

a processor that executes instructions stored in a memory to configure the processor to:

determine a point of interest (POI) based on a preference of an occupant of the vehicle, identify a plurality of charging stations based on a current location of the vehicle and the POI, identify a charging station from the plurality of charging stations based on distances from the current location to the plurality of charging stations and an attribute of the POI, autonomously control the vehicle to travel to the charging station, detect that the occupant has left the vehicle during a charging operation by the charging station, upon identification of a change in a status of the charging station, automatically send a message to a mobile device to cause the mobile device to display the change in status, upon detection that the mobile device is moving away from the vehicle after the change in status has been displayed, automatically prompt the mobile device to request that the occupant perform an action.

8. The system of claim 7, wherein the attribute comprises:

a person associated with the occupant currently being located at the POI.

9. The system of claim 7, wherein the attribute comprises:

one or more of an activity at the POI or a weather condition at the POI.

10. The system of claim 7, wherein the processor is configured to:

detect that a battery of the vehicle is currently receiving a charge from the charging station, and wherein, when the processor determines that the occupant has left the vehicle, the processor is configured to determine that the occupant has left the vehicle based on global positioning system (GPS) coordinates from the mobile device.

11. The system of claim 7, wherein the processor identifies the charging station based on execution of an artificial intelligence (AI) model on the current location, the plurality of charging stations, historical travel routes of the vehicle, and the attribute of the POI.

12. The system of claim 7, wherein the processor is configured to:

determine a route from a current location of the vehicle to the charging station, wherein the autonomous control is performed by an advanced driver-assistance system (ADAS) of the vehicle.

13. A non-transitory computer-readable medium comprising instructions that, when executed by a processor of a vehicle, cause the processor to perform:

determining a point of interest (POI) based on a preference of an occupant of the vehicle;

identifying a plurality of charging stations based on a current location of the vehicle and the POI;

identifying a charging station from the plurality of charging stations based on distances from the current location to the plurality of charging stations and an attribute of the POI;

autonomously controlling the vehicle to travel to the charging station;

determining that the occupant has left the vehicle during a charging operation by the charging station;

upon identifying a change in a status of the charging station, automatically sending a message to a mobile device to cause the mobile device to display the change in status;

upon detecting that the mobile device is moving away from the vehicle after the change in status has been displayed, automatically prompting the mobile device to request that the occupant perform an action.

14. The non-transitory computer-readable medium of claim 13, wherein the attribute comprises;

a person associated with the occupant currently being located at the POI.

15. The non-transitory computer-readable medium of claim 13, wherein the instructions cause the processor to perform;

detecting that a battery of the vehicle is currently receiving a charge from the charging station, and wherein the determining that the occupant has left the vehicle is based on global positioning system (GPS) coordinates from the mobile device.

16. The non-transitory computer-readable medium of claim 13, wherein the identifying of the charging station comprises:

identifying the charging station based on execution of an artificial intelligence (AI) model on the current location, the plurality of charging stations, historical travel routes of the vehicle, and the attribute of the POI.

17. The non-transitory computer-readable medium of claim 13, wherein the instructions cause the processor to perform;

determining a route from a current location of the vehicle to the charging station, wherein the autonomous control is performed by an advanced driver-assistance system (ADAS) of the vehicle.

* * * * *